(12) United States Patent
Alcaraz et al.

(10) Patent No.: US 10,465,302 B2
(45) Date of Patent: Nov. 5, 2019

(54) MODULAR GASEOUS ELECTROLYSIS APPARATUS WITH ACTIVELY-COOLED HEADER MODULE, CO-DISPOSED HEAT EXCHANGER MODULE AND GAS MANIFOLD MODULES THEREFOR

(71) Applicant: Marathon Systems, Inc., Fairfax, VA (US)

(72) Inventors: Ernest Charles Alcaraz, Vienna, VA (US); Monte S. Chawla, University Park, MD (US); Randolph R. Davis, Fairfax, VA (US); Dorin A. Jannotta, Jacksonville, FL (US); Austin Lowrey, III, Lancaster, PA (US); Thomas F. McGraw, New Bern, NC (US); Frederick Sandel, Fairfax Station, VA (US); Donald J. Waltman, Pasadena, MD (US)

(73) Assignee: Marathon Systems, Inc., Fairfax, VA (US)

( * ) Notice: Subject to any disclaimer, the term of this patent is extended or adjusted under 35 U.S.C. 154(b) by 0 days.

(21) Appl. No.: 15/438,768

(22) Filed: Feb. 22, 2017

(65) Prior Publication Data
US 2018/0087165 A1    Mar. 29, 2018

Related U.S. Application Data

(63) Continuation-in-part of application No. 14/815,935, filed on Jul. 31, 2015, now abandoned.
(Continued)

(51) Int. Cl.
*C25B 15/02* (2006.01)
*C25B 9/12* (2006.01)
(Continued)

(52) U.S. Cl.
CPC ............ *C25B 15/02* (2013.01); *C25B 9/00* (2013.01); *C25B 9/12* (2013.01); *C25B 15/08* (2013.01); *G21B 3/00* (2013.01); *G21C 3/38* (2013.01)

(58) Field of Classification Search
CPC .................................... C25B 1/02–1/12
(Continued)

(56) References Cited

U.S. PATENT DOCUMENTS 3,290,522 A   12/1966 Ginell
3,409,820 A   11/1968 Burke
(Continued)

FOREIGN PATENT DOCUMENTS

CN    101395677 B    7/2012
DE    102006007773 A1   9/2007
(Continued)

OTHER PUBLICATIONS

"Modular design", Wikipedia, available at https://en.wikipedia.org/wiki/Modular_design, accessed on Jan. 10, 2019 (Year: 2019).*
(Continued)

*Primary Examiner* — Harry D Wilkins, III
(74) *Attorney, Agent, or Firm* — ATFirm PLLC; Ralph P. Albrecht

(57) ABSTRACT

An improved, gaseous electrolysis apparatus can include a cooled header for electric connections or couplings, an exemplary co-disposed, coaxial heat exchanger around the reaction chamber to extract heat from the reaction chamber and exemplary rugged gas source and collection manifold(s) to support fixed and/or mobile applications in an embodiment. The system can include a heated anode and co-disposed cylindrical cathode within the reaction chamber and an improved electronic control circuit in an embodiment.

20 Claims, 15 Drawing Sheets

Related U.S. Application Data

(60) Provisional application No. 61/999,824, filed on Aug. 7, 2014.

(51) Int. Cl.
  *C25B 15/08* (2006.01)
  *C25B 9/00* (2006.01)
  *G21B 3/00* (2006.01)
  *G21C 3/38* (2006.01)

(58) Field of Classification Search
  USPC ............... 204/272; 123/3; 174/151–152 GM
  See application file for complete search history.

(56) References Cited

U.S. PATENT DOCUMENTS

| | | | |
|---|---|---|---|
| 3,755,128 | A | 8/1973 | Herwig |
| 4,117,254 | A * | 9/1978 | Richter .................... B03C 3/70 174/15.3 |
| 4,174,145 | A | 11/1979 | Oeschger |
| 4,265,721 | A * | 5/1981 | Hackmyer ............... C25B 1/04 205/340 |
| 4,593,758 | A | 6/1986 | Kyle |
| 4,835,433 | A | 5/1989 | Brown |
| 4,867,228 | A | 9/1989 | Novelli et al. |
| 5,075,160 | A | 12/1991 | Stinton et al. |
| 5,230,729 | A | 7/1993 | Mccandlish |
| 5,273,203 | A | 12/1993 | Webster |
| 5,273,635 | A | 12/1993 | Gernert et al. |
| 5,318,675 | A | 6/1994 | Patterson |
| 5,352,269 | A | 10/1994 | Mccandlish |
| 5,366,712 | A | 11/1994 | Violante et al. |
| 5,395,422 | A | 3/1995 | Schulz et al. |
| 5,411,654 | A | 5/1995 | Ahern et al. |
| 5,429,725 | A | 7/1995 | Thorpe et al. |
| 5,472,614 | A | 12/1995 | Rossi |
| 5,569,561 | A | 10/1996 | Exnar et al. |
| 5,674,632 | A | 10/1997 | Ahern et al. |
| 5,770,036 | A | 6/1998 | Ahern et al. |
| 6,051,110 | A | 4/2000 | Dell'Orfano et al. |
| 6,248,221 | B1 | 6/2001 | Davis et al. |
| 6,620,994 | B2 | 9/2003 | Rossi |
| 7,244,887 | B2 | 7/2007 | Miley |
| 7,579,117 | B1 | 8/2009 | Beard |
| 7,767,066 | B2 | 8/2010 | May |
| 8,051,637 | B2 | 11/2011 | Gaudencio Aquino |
| 8,227,020 | B1 | 7/2012 | Miley |
| 8,264,382 | B2 | 9/2012 | Rigolle et al. |
| 8,303,865 | B1 | 11/2012 | Cravens |
| 8,419,919 | B1 | 4/2013 | Boss et al. |
| 8,603,405 | B2 | 12/2013 | Miley |
| 8,636,881 | B2 | 1/2014 | May |
| 8,652,319 | B2 | 2/2014 | Kothe |
| 8,679,326 | B2 | 3/2014 | Vinci et al. |
| 2002/0046762 | A1 | 4/2002 | Rossi |
| 2004/0084326 | A1 * | 5/2004 | Weinberg ................ C25B 1/02 205/628 |
| 2005/0105664 | A1 | 5/2005 | Chubb |
| 2005/0120715 | A1 | 6/2005 | Labrador |
| 2005/0199747 | A1 | 9/2005 | Roarty |
| 2007/0170051 | A1 | 7/2007 | Schlaikjer |
| 2007/0280398 | A1 | 12/2007 | Dardik |
| 2008/0017504 | A1 * | 1/2008 | Liu ........................ C25C 3/085 204/228.3 |
| 2008/0159461 | A1 | 7/2008 | Chubb |
| 2008/0205572 | A1 | 8/2008 | Chubb |
| 2010/0123022 | A1 | 5/2010 | Roarty |
| 2010/0259422 | A1 | 10/2010 | Rigolle et al. |
| 2010/0275859 | A1 * | 11/2010 | Klotz ...................... C25B 1/06 123/3 |
| 2010/0300945 | A1 | 12/2010 | Vinci et al. |
| 2011/0005506 | A1 | 1/2011 | Rossi |
| 2011/0044419 | A1 | 2/2011 | Cook |
| 2011/0155566 | A1 * | 6/2011 | Martinez Cao .......... C25B 1/04 204/269 |
| 2011/0247929 | A1 * | 10/2011 | Nagai .................. C02F 1/46109 204/290.15 |
| 2011/0253527 | A1 * | 10/2011 | Hui ...................... C02F 1/46104 204/267 |
| 2012/0008728 | A1 | 1/2012 | Fleming |
| 2013/0044847 | A1 | 2/2013 | Steinberg |
| 2013/0233718 | A1 | 9/2013 | Roarty |
| 2013/0243143 | A1 | 9/2013 | Mastromatteo et al. |
| 2014/0099252 | A1 | 4/2014 | Chason et al. |
| 2014/0202877 | A1 * | 7/2014 | Greenbaum ............ C25B 11/02 205/630 |
| 2014/0326711 | A1 | 11/2014 | Rossi |
| 2014/0332087 | A1 | 11/2014 | Godes et al. |
| 2015/0000252 | A1 | 1/2015 | Moore et al. |
| 2015/0211131 | A1 * | 7/2015 | Jacobs .................... C25B 15/02 204/236 |
| 2017/0088958 | A1 * | 3/2017 | Koeneman ............ C25B 11/02 |

FOREIGN PATENT DOCUMENTS

| | | | |
|---|---|---|---|
| DE | 102006007773 | B4 | 2/2010 |
| EP | 0568118 | A2 | 11/1993 |
| GB | 2231195 | A | 11/1990 |
| JP | S6270203 | A | 3/1987 |
| JP | 63-282286 | A * | 11/1988 ............... C25B 9/00 |
| WO | WO1990010935 | A1 | 9/1990 |
| WO | WO1990014669 | A1 | 11/1990 |
| WO | WO 1995/020816 | | 8/1995 |
| WO | WO1995020816 | A1 | 8/1995 |
| WO | WO 2004044924 | A1 | 5/2004 |
| WO | WO 2007096120 | A2 | 8/2007 |
| WO | WO 2007130156 | A2 | 11/2007 |
| WO | WO 2013170244 | A2 | 11/2013 |
| WO | WO 2013170244 | A3 | 1/2014 |

OTHER PUBLICATIONS

Egan, Implementing a Successful Modular Design—PTC's Approach, 7th Workshop on Product Structuring—Product Platform Development, Chalmers Univeristy of Technolog, Goteborg, Germany, Mar. 2004, pp. 49-58 (Year: 2004).*

Martin Fleischmann and Stanley Pons, "Electrochemically Induced Nuclear Fusion of Deuterium," submitted to the Journal of Electroanalytical Chemistry, Mar. 11, 1989.

Thomas F. McGraw and Randolph R. Davis, "Critical Factors in Transitioning from Fuel Cell to Cold Fusion Technology," 33rd Intersociety Engineering Conference on Energy Conversion (IECEC-98-1271), Colorado Springs, CO, Aug. 2-6, 1998.

David Nagel et al., briefing charts from "Perspectives on Low Energy Nuclear Reactions Workshop/Short Course," NUCAT Energy, LLC, held at Hyatt Regency Crystal City, VA, Oct. 3-4, 2011.

Bob Sterling, "The Nuclear Reactor in Your Basement," NASA Newsletter on Global Climate Change, Feb. 12, 2013.

R.G. Bosisio et al., "The Large Volume Microwave Plasma Generator (LMP™): A New Tool for Research and Industrial Processing," Journal of Microwave Power, 7(4), 1972.

Yu.A.Lebedev, "Microwave Discharges: Generation and Diagnostics," 25th Summer School and International Symposium on the Physics of Ionized Gases (SPIG 2010), Journal of Physics: Conference Series 257 (2010) 012016.

K.P. Sinha, "A Theoretical Model for Low-Energy Nuclear Reactions in a Solid Matrix," Infinite Energy Magazine, Issue 29, 1999.

F. A. Leavitt et al., "Use Application and Testing of Hi-Z Thermoelectric Modules," Hi-Z Technology, Inc., 2007.

David S. Alexander, "Advanced Energetics for Aeronautical Applications," vol. I, NASA/CR-2003-212169, Feb. 2003, and vol. II, NASA/CR-2005-213749, Apr. 2005.

Marty K. Bradley and Christopher K. Droney, "Subsonic Ultra Green Aircraft Research—Phase II: N+4 Advanced Concept Development," NASA/CR-2012-217556, May 2012.

"Energy Loss and Range of Electrons and Pinions," National Bureau of Standards Circular 577, 1956. No month and/or year given.

(56) References Cited

OTHER PUBLICATIONS

A.G. Lipson, DM Sakov, V.B. Kalinin, E.I. Saunin and B.V. Derjaguin, "Observation of Neutrons and Tritium in Kd2PO4 Single Crystals Upon the Ferroelectric Phase Transition," Fourth International Conference on Cold Fusion, Dec. 6-9, 1993.

B. Danapani and M. Fleischman. "Electrotytic Separation Factors on Palladium," Journal of Electrochemistry, 39, pp. 323-332, 1972. No month and/or year given.

Brian D. Andresen, Richard Whipple, Armando Alcaraz, Jeffrey S. Haas, and Patrick M. Grant, "Potentially Explosive Organic Reaction Mechanisms in Pd/D2O Electrochemical Cells," Chemical Health & Safety, 1(3), pp. 44-47, Oct./Nov. 1994.

D.L. Donohue and Milica Petek, "Isotopic Measurements of Palladium Metal Containing Protium and Deuterium by Glow Discharge Mass Spectrometry," Analy. Chem. 63, p. 740-744, 1991. No month and/or year given.

D.P. Stinton, T.M. Besmann, S. Shanmugham, A. Bleier, E. Lara-Curzio, "Development of Osidation/Corrosion-Resistant Composite Materials and Interfaces," Fossile Energy Program Annual Progress Report for Apr. 1994-Mar. 1995, ORNL-6874, pp. 21-33, 1995.

D.W. Mo, Q.S. Cai, L.M. Wang, S.Z. Wang, "The Evidence of Nuclear Transmutation Phenomeno in Pd-H System Using NAA (Neutron Activation Analysis)," ICCR-7, Vancouver, pp. 259-263. No month and/or year given.

Debra R. Rolison and William E. O'Grady. "Observation of Elemental Anomalies at the surface of Palladium after Electrochemical Loading of Deuterium or Hydrogen," Analytical Chemistry, 63(17), pp. 1697-1702, Sep. 1, 1991, D.W. Mo, Q.S. Cai, L.M. Wang, S.Z.

Eiichi Yamaguchi and Hiroshi Sugiura. Excess Heat and Nuclear Products from Pd:D/Au Heterostructures by the 'In-vacno' Method, ICCF-7, Vancouver, pp. 420-424. No month and/or year given.

Eiichi Yamaguchi and Hiroshi Sugiura. Excess Heat and Nuclear Products from Pd:D/Au Heterostructures by the 'In-vacuo' Method, ICCF-7, Vancouver, pp. 420-424. No month and/or year given.

Ex parte Dash. No. 92-3536, U.S. Patent and Trademark Office Board of Patent Appeals and Interferences, 27 USPQ2d, pp. 1481-1492. No month and/or year given.

F. Piantelli, S. Focardi and R. Habel, "Energy Generation and Generator by Means of Anharmonic Stimulated Fusion," International Patent reproduced in Infinite Energy. Sep.-Oct. 1995, pp. 24-31. No month and/or year given.

G. Mengoli et al. "Calorimetry Close to the Boiling Temperature of the D2O/Pd Electrolytic System," Journal of Electroanalytical Chemistry, 444, pp. 155-167, 1998. No month and/or year given.

Heinrich Hora, George H. Miley, Jak C. Kelly, and Y. Narne, "Nuclear Shell Magic Numbers Agree With Measured Transmutation by Low-Energy Reactions," ICCF-7, Vancouver, pp. 147-151. No month and/or year given.

Hydrogen in Metals I: Basic Properties, G. Alefeld and J. Volkl (ed.), Chapters ;8 and 12, Springer-Verlag, Berlin, 1978. No month and/or year given.

Hydrogen in Metals II: Application-Oriented Properties, G. Alefeld and J. Volkl (ed.), Chapter 7, Springer-Verlag, Berlin, 1978.

Jellinek, "Theoretical Dynamical Studies of Metal Clusters and Cluster-Ligand Systems," Metal-Ligand Interactions: Structure and Reactivity, N. Russo (ed.), Kluwer-Dordrecht, 1995. No month and/or year given.

Ray E. Kidder, "Energy Transfer Between Charged Particles by Coulomb Collosions," URL-5213, University of California Radiation Laboratory, Livermore, California, May 12, 1958.

Robert J. LeRoy, Steven G. Chapman, and Frederick R. W. McCourt, "Accurate Thermodynamic properties of the Six Isotopomers of Diatomic Hydrogen," The Journal of Physical Chemistry, 94(2), pp. 923-929, 1990. No month and/or year given.

S. Focardi, R. Habel, and F. Piantelli, Anomalous Heat Production in Ni—H Systems, Il Nuovo Cimento, 107A(1), pp. 163-167, Feb. 1994.

S. Srinivasan, "Fuel Cells for Extraterrestrial and Terrestrial Applications," Journal of the Electrochemical Society, 136(2), 41-48C, Feb. 1989.

S. Ueda, K. Yasuda and A. Takahashi, "Study of Excess Heat and Nuclear Products with Closed Electrolysis System and Quadrupole Mass Specirometer," ICCF-7, Vancouver, pp. 398-402, No month and/or year given.

S.W. Stafford and R.B. McLellan, "The Solubility of Hydrogen in Nickel and Cobalt," Acta Metallurgica. 22, pp. 1463-1468, 1974. No month and/or year given.

Talbot A. Chubb and Scott R. Clubb, "Cold Fusion as an interaction Between Ion Band States," Fusion Technology, 20, pp. 93-99, Aug. 1991.

Y. Arata and Y. Zhang, "Helium (42He, 32He) within Deuterated Pd-Black," Proceeding of the Japanese Academy, vol. 73(B), No. 1, pp. 1-6 (1997). No month and/or year given.

Y. Oya, H. Ogawa, M. Aida, K. Iinuma and M. Okamoto, "Material Conditions to Replicate the Generation of Excess Energy and the Emission of Excess Neutrons," ICCF-7, Vancouver, pp. 285-291. No month and/or year given.

U.S. Appl. No. 61/999,824, filed Aug. 7, 2014.

Martin Fleischmann and Stanley Pons, "Electrochemically Induced Nuclear Fusion of Deuterium," Journal of Electroanalytical Chemistry, 261, pp. 301-, 1989.

M.C.H. McKubre et al., "Excess Power Observations in Electrochemical Studies of the D/Pd System: The Influence of Loading," 3rd International Conference on Cold Fusion, Frontiers of Cold Fusion, Nagoya, Japan, 1992, Universal Academy Press, Inc., Tokyo, Japan.

K. Kunimatsu et al., "Deuterium Loading Ratio and Excess Heat Generation during Electrolysis of Heavy Water by Palladium Cathode in a Closed Cell using a Partially Immersed Fuel Cell Anode," 3rd International Conference on Cold Fusion, Frontiers of Cold Fusion, Nagoya, Japan, 1992, Universal Academy Press, Inc., Tokyo, Japan.

V. Violante et al., "RF Detection and Anomalous Heat Production during Electrochemical Loading of Deuterium in Palladium," Energia, Ambiente e Innovaziene, 2-3, pp. 63-77, 2014.

M. Miles et al., "Correlation of Excess Power and Helium Production during D2O and H2O Electrolysis using Palladium Cathodes," Journal of Electroanalytical Chemistry, 346, p. 99-, 1993.

M.C.H. McKubre et al., "The Emergence of a Coherent Explanation for Anomalies Observed in D/Pd and H/Pd System: Evidence for 4He and 3He Production," 8th International Conference on Cold Fusion, 2000, Lerici (La Spezia), Italy: Italian Physical Society, Bologna, Italy.

P.A. Boss et al., "Investigation of Nano-Nuclear Reactions in Condensed Matter," U.S. Department of Defense, 2016.

T. McGraw and R. Davis, "Critical Factors in Transitioning from Fuel Cell to Cold Fusion Technology," 33rd Intersociety Engineering Conference on Energy Conversion (IECEC-98-1271), Colorado Springs, CO, Aug. 2-6, 1998.

M. Chawla and R. Davis, "Key Issues Related to Industrialization of LENR-Based Space Propulsion," Space Technology & Applications Industrial Forum, Apr. 2016 (draft).

J. J. Thomson, "On the Electrolysis of Gases," Proceedings of the Royal Society, 58, No. 350, pp. 244-257, Jun. 1885.

F. A. Maxfield f R. R. Benedict, "Theory of Gaseous Conduction and Electronics," pp. 270-274 and 293-294, McGraw-Hill, 1941.

S. C. Brown, "Introduction to Electrical Discharges in Gases," pp. 188-190, John Wiley & Sons, 1966.

A. V. Phelps, "Cross Sections and Swarm Coefficients for H+, H2+, H3+, H, H2 and H− in H2 for Energies from 01. eV to 10 keV," Journal of Physical Chemistry, Reference Data, 19, No. 3, 1990.

R.G. Bosisio et al., "The Large Volume Microwave Plasma Generator (LMPTM): A New Tool for Research and Industrial Processing," Journal of Microwave Power, 7(4), 1972.

Davis, Randolph R., "Technical Background for Mk12.31 Program," NEPS-TN-004, New Energy Power Systems LLC, Fairfax, VA 22038, dated Mar. 29, 2018, published/submitted Apr. 5, 2018.

* cited by examiner

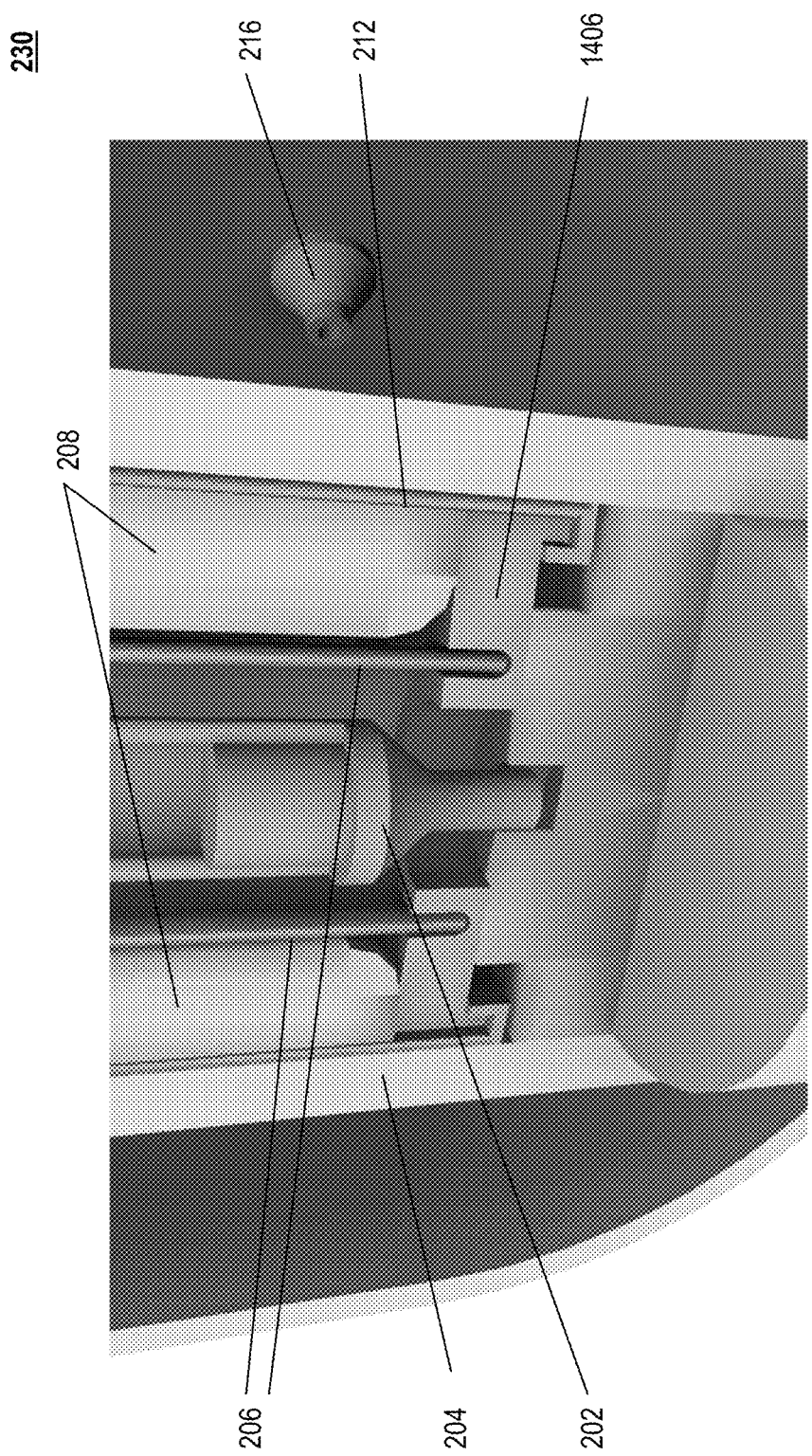

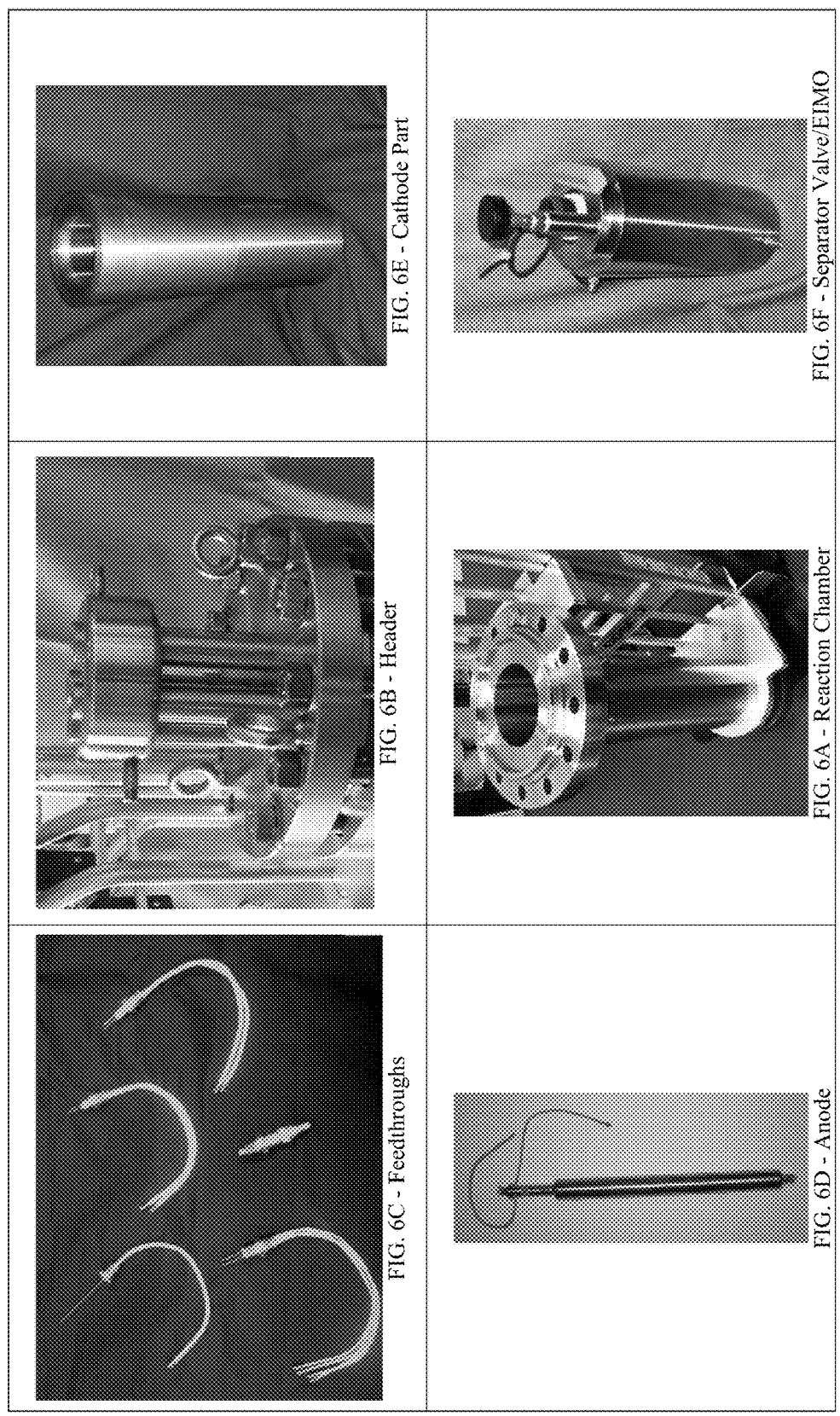

MODULAR GASEOUS ELECTROLYSIS APPARATUS WITH ACTIVELY-COOLED HEADER MODULE, CO-DISPOSED HEAT EXCHANGER MODULE AND GAS MANIFOLD MODULES THEREFOR

CROSS-REFERENCE TO RELATED APPLICATIONS

This Application claims benefit under 35 U.S.C. § 120 and is a continuation-in-part of U.S. NonProvisional patent application Ser. No. 14/815,935 filed Jul. 31, 2015, presently pending, which claims benefit under 35 U.S.C. § 119(e) of U.S. Provisional Patent Application No. 61/999,824 filed Aug. 7, 2014, both of which are of common assignee to the present application, the contents of both of which are incorporated herein by reference in their entireties.

BACKGROUND OF THE DISCLOSURE

1. Field of the Disclosure

The present disclosure relates generally to electrolysis systems that employ hydrogen and/or deuterium gas for practical production of useful quantities of heat for application to many challenging opportunities. More specifically, the present disclosure relates to improved materials, structures and methods for improving low energy nuclear reaction (LENR) systems. This invention specifically addresses the technical challenges of significant energy production in an industrially viable configuration.

2. Description of the Related Art

In 1989, Martin Fleischmann and Stanley Pons announced the discovery of anomalous heat production in electrolytic cells of deuterium oxide and palladium (see, e.g., ref "Electrochemically Induced Nuclear Fusion of Deuterium," submitted to the Journal of Electroanalytical Chemistry, Mar. 11, 1989). The announcement became extremely controversial when other workers could not reproduce their results. The difficulty in part results from the problem of properly loading deuterium into the cathode. Over the intervening years, however, many other workers have reported positive results. Examples of evidence showing excess heat is obtainable in liquid electrolysis cells include: "Excess Power Observations in Electrochemical Studies of the D/Pd System: The Influence of Loading," by M. C. H. McKubre et al.; "Deuterium Loading Ratio and Excess Heat Generation during Electrolysis of Heavy Water by Palladium Cathode in a Closed Cell using a Partially Immersed Fuel Cell Anode," by K. Kunimatsu et al.; and "RF Detection and Anomalous Heat Production during Electrochemical Loading of Deuterium in Palladium," by V. Violante et al. Examples of evidence showing fusion by-products are obtainable include: "Correlation of Excess Power and Helium Production during $D_2O$ and $H_2O$ Electrolysis using Palladium Cathodes," by M. Miles et al.; "The Emergence of a Coherent Explanation for Anomalies Observed in D/Pd and H/Pd System: Evidence for $^4He$ and $^3He$ Production," by M. C. H. Mckubre et al.; and U.S. Department of Defense report, "Investigation of Nano-Nuclear Reactions in Condensed Matter," by P. A. Boss et al. Today, there exists a body of knowledge contained in over a thousand books and papers documenting the advances made in the field of LENR (Low Energy Nuclear Reactions). Operability is demonstrated by the numbers of efforts that produced positive results, accurate scientific measurement methods used, and ability to discuss easily the results with the worldwide scientific community.

Based on the above and foregoing, it can be appreciated that there presently exists a need in the art for an improved gas electrolysis apparatus that overcomes difficulties in up-scaling of liquid LENR systems and that directly links laboratory experimental apparatuses with a commercially useful device for producing energy at levels of practical interest. The present disclosure was also motivated by a desire to overcome issues in future development of conventional energy sources. Conventional energy systems produce hydrocarbon emissions believed to cause climate changes and that threaten human, animal and plant existence. Conventional energy systems fail to provide modular, reliable, rugged and self-contained power sources providing heat and/or electricity in applications ranging from fixed power sources to mobile vehicles. A sense of urgency for such new power sources has resulted from the realization that, in addition, fossil fuels are in limited supply. Conventional nuclear fission power plants are not an acceptable alternative due to the dangers associated with uncontrolled releases of fission products, the enormous environmental and political problems associated with nuclear waste disposal, costs and inflexible designs. In particular, there is widespread need for innovative energy sources that do not rely on established energy infrastructures. Furthermore, cost-effective, modular and scalable designs are needed to increase applicability.

SUMMARY OF THE INVENTION

An example embodiment of the invention may include: a gaseous electrolysis apparatus, which can include: a) a cooled header with at least one electrical connector or coupling; b) a heat exchanger configured to remove heat from a surface of a reaction chamber; c) a gas handling system mechanically coupled to the reaction chamber; and d) an electronic control circuit (ECC) electrically coupled or connected to the header and gas handling system.

In one example embodiment, the gaseous electrolysis apparatus can include where the header can include at least one of: a cooling apparatus; a cooling manifold or water jacket; or at least one feedthrough to a header cooling manifold proximate to the header.

In one example embodiment, the gaseous electrolysis apparatus can include the at least one feedthrough, and where the at least one feedthrough can include at least one of: a pressure side oriented towards the inside of the reaction chamber; is welded into a thermal plate; wherein one end of the feedthrough extends beyond the header for connection with the electronic control circuit; or wherein the at least one feedthrough comprises a threaded coupling.

In one example embodiment, the gaseous electrolysis apparatus can include where the header can include: at least one anode connection; at least one anode heater wire connection; at least one microwave antenna connection; at least one thermal sensor connection; at least one microwave loop antenna; and at least one insulator configured to at least one of: electrically isolate; minimize the volume where gas resides; or provide mechanical support for components within the reaction chamber.

In one example embodiment, the gaseous electrolysis apparatus can further include a modular, removable anode; an anode where the edges of the anode facing the cathode are tapered or curved to help prevent high voltage breakdown between the anode and cathode; and an electric heater disposed within the anode.

In one example embodiment, the gaseous electrolysis apparatus can further include a modular, removable, hollow-shaped, cylindrical cathode with a central cavity configured to receive the anode; a cathode encased by an outer metal supporting sleeve; a cathode bounded at its base and top with insulator endcaps; and a cathode wherein the edges of the reaction material part of the cathode facing the anode are tapered or curved to help prevent high voltage breakdown.

In one example embodiment, the gaseous electrolysis apparatus can include where the heat exchanger is modular and can include: a relatively low volume flash boiler configured to provide a mist of water or other coolant to the outer surface of the reaction chamber; is co-disposed around the reaction chamber; a plurality of spray nozzles to cool at least one portion of the reaction chamber; at least one steam pressure port; and at least one thruster port configured to provide pressure output.

In one example embodiment, the gaseous electrolysis apparatus can include where the gas handling system can include: four (4) separate gas manifolds that control gas flow while minimizing gas volume external to the reaction chamber, where the four separate gas manifolds can include: a hydrogen/deuterium gas supply manifold; an inert carrier gas manifold; a reaction gas product collection manifold; and a gas measurement and evacuation manifold.

In one example embodiment, the gas electrolysis apparatus can include where the gas manifold can include: a cooling chamber or water jacket to provide cooling for gas tubing and pipes connected or coupled to the reaction chamber; at least one gas compatible valve, at least one pressure sensor and at least one temperature sensor connected to, or coupled to the electronic control circuit/subsystem; at least one tank or at least one container whose known volume enables small quantities of gas to be determined by calculating pressure, temperature and volume before gas is transferred into or out of the reaction chamber; and at least one purge port which can be used to evacuate gases manually from containments of the gas manifolds.

In one example embodiment, the gas electrolysis apparatus can include a reaction gas product collection manifold wherein the reaction gas product collection manifold further comprises: a container configured to temporarily store reactant gas and periodically permit extraction from the container; and a subsystem comprising an acoustic sensor or other type of electronic interface to facilitate estimation of quantities of reaction product gas.

In one example embodiment, the gaseous electrolysis apparatus according to claim 1, wherein the electronic control circuit (ECC) further comprises: a special-purpose computer and display monitor, the special-purpose computer comprising at least one of a microprocessor or a microcontroller, and comprising control software; special-purpose anode-to-cathode voltage/current supply; at least one anode heater supply; at least one microwave starter or initiator electronics; and at least one heat exchanger electronics.

The present application provides an improved apparatus or system utilizing gaseous electrolysis techniques according to an exemplary embodiment, including: (1) an exemplary cooled header for electric connections; (2) an exemplary co-disposed, coaxial heat exchanger/thruster around an exemplary reaction chamber to extract heat from, or perform testing of, the reaction chamber; and (3) exemplary rugged, modular gas source and gas collection manifolds. In addition, the application provides an exemplary modular anode; an exemplary modular, cylindrical cathode co-disposed around the anode; and, an improved modular electronic control circuit for control of apparatus operation.

One aspect of an exemplary embodiment of the present disclosure is to provide a modular electrolysis apparatus. According to one aspect of the present disclosure, the modular apparatus can enable a number of system houses to manufacture, install, repair and otherwise support industrialization objectives.

An aspect of an exemplary embodiment of the present disclosure is to provide an electrolysis apparatus which can utilize a new header design for electrical power, device control and instrumentation connections or couplings. One aspect of the disclosure, in an exemplary embodiment, is that the header advantageously enables the apparatus to be serviced when internal components are expended or may require maintenance. According to another aspect of an exemplary embodiment of the disclosure, the header can include components that are adapted to be cooled to advantageously enable the apparatus to be operated for longer times between maintenance periods.

Another aspect of an exemplary embodiment of the present disclosure is to provide an exemplary heat exchanger module to extract heat from the electrolysis system. According to another aspect of an exemplary embodiment of the present disclosure, the heat exchanger module can facilitate and control a thermal gradient through the cathode module and the wall of the reaction chamber module.

Yet another aspect of an exemplary embodiment of the present disclosure is to provide gas source and collection manifolds for electrolysis apparatuses. According to another aspect of an exemplary embodiment of the present disclosure, these gas handling manifolds can be designed and engineered to be rugged and compact to support fixed and/or mobile operation.

According to another aspect of an exemplary embodiment of the present disclosure, the inventive electrolysis apparatus can apply to an exemplary gas electrolysis apparatus having a cylindrical configuration which can utilize the above-mentioned improved exemplary header, co-disposed cylindrical heat exchanger and application specific gas handling manifolds. It should be mentioned that the exemplary cylindrical configuration of the electrolysis apparatus, according to an exemplary embodiment, can take advantage of radial and variable electric fields, gas pressure and thermal diffusion gradients, promoting gas transport into and through reaction material in the cathode.

Another aspect of an exemplary embodiment of the present disclosure is to provide a modular/removable anode within the reaction chamber that contains an internal electric heater and that can, by thermal radiation and diffusion, raise the temperature of the reaction material in the cathode.

Another aspect of an exemplary embodiment of the present disclosure is to provide a modular cathode that can be cylindrical and co-disposed around the anode within the reaction chamber, and which can include an exemplary consolidated metal powder and be encased with a supporting sleeve according to an exemplary embodiment. These improvements can provide further advantages in addition to the co-disposed cathode and consolidated cathode reaction material comprising nanocrystalline particles described earlier in U.S. Pat. No. 6,248,221 B1, the content of which is incorporated herein by reference in its entirety.

These and other aspects, features and advantages according to an exemplary embodiment of the present disclosure are provided by the exemplary header module that can be a modular unit and can include one or more exemplary high-temperature electric feedthroughs, one or more exemplary high-pressure gasket or gaskets, an exemplary cooling manifold or water jacket, exemplary electric wiring, exemplary connectors and exemplary supporting ceramic insulators.

The feedthroughs can be constructed with appropriately sized conductors and rugged insulating materials as illustrated in the accompanying drawing figures. According to an aspect of the disclosure, the exemplary electric feedthroughs and gasket(s) can enable high-pressure operation, as well as a vacuum startup environment, within the exemplary reaction chamber module to be maintained and isolated from the local external environment during operation. According to another exemplary aspect of the present disclosure, the exemplary electric feedthroughs enable internal components of the electrolysis system to be connected or coupled to external components of its electronic control circuit module. According to another aspect of the present disclosure, the cooling manifold or water jacket can maintain sufficiently low temperature during operation of the electrolysis apparatus for the feedthroughs and gasket(s) to maintain mechanical integrity over long periods of operation, in an exemplary embodiment. According to yet another aspect of the present disclosure, the exemplary electric wiring, connectors or couplers and ceramic insulators can be designed so that they connect to, or couple and provide mechanical support to the apparatus's high-voltage, high-temperature anode module, thermal sensor and any other necessary electric connections or couplings within the reaction chamber module, such as to an initiator/microwave antenna. In an exemplary embodiment, the exemplary header module can be able to be installed (closed) and later removed (opened) for maintenance with exemplary anode module, initiator/microwave antenna, and thermal sensor attached.

These and other aspects, features and advantages according to an exemplary embodiment of the present disclosure are provided by an exemplary heat exchanger that can surround and can be coaxial to the reaction chamber of the electrolysis system in one embodiment. According to one exemplary aspect of the present disclosure, the heat exchanger can be a relatively low volume flash boiler engineered to provide a mist of water or other appropriate coolants to the surface of the reaction chamber. Advantageously, the resulting comparatively low temperature of the surface of the exemplary reaction chamber can produce a thermal gradient to facilitate thermal diffusion of gases through the cathode over long periods of operation, and, therefore, can be important to the heat producing process within the reaction material. According to another aspect of the disclosure, the exemplary heat exchanger can include spray nozzle(s), coolant pressure regulator(s) and/or a coolant pump that can be regulated and/or controlled to provide appropriate quantities of coolant to the surface of the reaction chamber. According to another aspect of the present disclosure, the exemplary heat exchanger can include one or more steam pressure port(s) and/or steam pressure regulator(s) to maintain a sufficiently high steam pressure for heating and power applications.

The exemplary electrolysis apparatus can preferably include a hydrogen/deuterium gas supply manifold, an inert carrier gas manifold, a reaction gas manifold and/or a gas measurement and evacuation manifold as part of an exemplary gas handling subsystem. The exemplary manifolds can each include individual cooling chambers, exemplary high-pressure-rated tubing and fittings, electrically and mechanically operated valves, measurement chambers and electrically-operated pressure and temperature sensors, according to an exemplary embodiment. According to one aspect of an exemplary embodiment of the present disclosure, the manifolds can be designed and engineered to be rugged, and occupy a minimum volume around the reaction chamber to support safety requirements. According to another aspect of an exemplary embodiment of the present disclosure, the gas handling manifolds can advantageously minimize the volume(s) or amounts of gas used while enabling relatively accurate flow control. The hydrogen/deuterium gas supply manifold can enable predetermined, controlled quantities of gas to be provided into the reaction chamber of the electrolysis system, according to an exemplary embodiment. The carrier gas supply manifold can enable predetermined quantities of carrier gas (e.g., argon) to be provided during start-up and maintenance periods into the exemplary reaction chamber, according to an exemplary embodiment. The reaction gas manifold can enable reactant gases to be temporarily stored and periodically extracted as a saleable and profitable resource, according to an exemplary embodiment. According to an exemplary embodiment, extracted reactant gas can be permanently stored and/or maintained according to applicable standards and regulations using formal methods that are not part of the present disclosure. According to yet another aspect of the present disclosure, the gas measurement and evacuation manifold can enable quantities of gases from the reaction chamber and other sections of the gas handling system to be extracted and analyzed as needed during start-up and maintenance periods, according to an exemplary embodiment. Gases extracted through this manifold during maintenance can also be stored and maintained according to applicable standards and regulations, according to an exemplary embodiment.

These and other aspects, features and advantages according to an exemplary embodiment of the present disclosure are provided by an exemplary modular gas electrolysis apparatus that can include the cooled header for electric connections or couplings, exemplary anode, exemplary cylindrical, co-disposed cathode, exemplary coaxial heat exchanger around the reaction chamber and rugged, gas manifolds, according to one exemplary embodiment.

Moreover, to support industrial applications the exemplary electrolysis apparatus preferably can include an improved, modular electronic control circuit, according to an exemplary embodiment. The improved circuit can provide further advantages in addition to functionality of the electronic control circuitry described earlier in U.S. Pat. No. 6,248,221 B1, the contents of which are incorporated herein by reference in their entirety.

According to one exemplary embodiment, the gaseous electrolysis apparatus can include: a header including at least one electrical connector or coupling; an anode with internal heater; a cathode disposed within a reaction chamber; a heat exchanger in proximity to the reaction chamber, the reaction chamber coupled to the header, the heat exchanger configured to remove heat from a surface of the reaction chamber; a gas handling system mechanically coupled to the reaction chamber; and an electronic control circuit or subsystem (ECC) electrically or electronically coupled to the gas handling system and to the header.

The detail below supports further understandings to bridge the gaps between laboratory research and a commercially useful device for producing heat energy at levels of practical interest by providing additional clarity into alternatively useable embodiments and characteristics of the alternative embodiments.

According to one exemplary embodiment, the header can include a high pressure gasket and at least one electrical connection or coupling configured to enable opening and closing of the gaseous electrolysis apparatus or the replacement of parts.

According to one exemplary embodiment, the gaseous electrolysis apparatus can include a header, including at least one feedthrough to a header cooling chamber proximate to the header.

According to one exemplary embodiment, the header can include feedthroughs, where at least one feedthrough is optimally built so that a pressure side of the feedthrough can be oriented towards the inside of the reaction chamber; where at least one feedthrough is welded into a thermal plate; where one end of the feedthroughs extends beyond the header for connection or coupling with the electronic control circuit or subsystem; or wherein at least one feedthrough can include a threaded coupling.

According to one exemplary embodiment, the gaseous electrolysis apparatus can include a header that includes at least one of: a cooled header which is a coolant cooled header; a liquid cooled header; a water cooled header; or a gas cooled header; or wherein the cooling apparatus can include at least one of: a header cooling chamber; a cooling manifold; a jacket; a cooling jacket; a fin; a cooling fin; a manifold; a fixture; a cooling fixture; a plate; a thermal plate; a header cooling jacket; a header cooling fixture; a cooling manifold; or a water jacket adapted to maintain a sufficiently low temperature for a gasket and at least one feedthrough.

According to one exemplary embodiment, the header can include at least one of: a temperature measurement device to monitor temperature of the header or a cooling apparatus; a gas detector configured to detect any leak through the header and that includes a gas volume coupled to the header; or a microwave loop antenna for irradiating a volume within the reaction chamber that includes a ceramic case, where the ceramic case comprises a ceramic tube, a stabilizer to provide mechanical stability, or a protector.

According to one exemplary embodiment, the header can include at least one insulator configured to electrically isolate, minimize the volume where gas could reside, and provide mechanical support for the anode, cables, electrical connections or couplings, or internal reaction chamber components, and wherein at least one insulator can include at least one of: a ceramic insulator; a plurality of ceramic insulators; a robust, thick ceramic insulator; or a reflector or a reflective heat shield or a baffle on a lower surface in order to reflect heat into the reactor volume.

According to one exemplary embodiment, the gaseous electrolysis apparatus can include an anode coupled to at least one electrical connector or coupling in the header.

According to one exemplary embodiment, the anode can include a heater coupled to an electrical connector or coupling in the header and thus coupled to the electronic control circuit.

According to one exemplary embodiment, the gaseous electrolysis apparatus can include co-disposed within the reaction chamber a cylindrical, coaxial cathode that is of modular design or is configured to be a removable unit and that is electrically coupled, connected or grounded to the reaction chamber.

According to one exemplary embodiment, the cathode can include at least one of: an outer metal sleeve; an outer metal stainless steel sleeve; or be bounded by a base, a top, or with a ceramic insulator endcap(s) that contain a plurality of holes for reaction gas to escape.

According to one exemplary embodiment, the cylindrical, co-disposed cathode within the reaction chamber can include a consolidated metal powder of modular design or a material that includes metal powder or metal particles, wherein the cathode material can be at least one of: a shape to provide for high packing density and enable consistent cathode industrial production; include a spherical powder/particle of a small medial size on the order of a few microns, with a tight Gaussian distribution around the medial size; a consolidated metal powder with high specified density or have a low value of porosity determined to be a value between 0 and 20%; or comprise, consist, or consist essentially of a single or multiple elements selected from the group consisting of Fe, Ni, Cu, Mo, Cr, Co, Mg, Ag, and W. According to another exemplary embodiment, the edges of this reaction material part facing the anode can be tapered or curved to reduce the concentration of electric fields between the anode and cathode.

According to one exemplary embodiment, the heat exchanger can include a co-axial heat exchanger or be co-disposed around the reaction chamber and enable a thermoelectric generator to be disposed also around or about a portion of the surface of the reaction chamber, or a system of multiple thermocouples to be disposed around or about a portion of the surface of the reaction chamber.

According to one exemplary embodiment, the heat exchanger can include at least one of: a flash boiler enabling a weight of coolant to be minimized for a mobile or transportable applications; a flash boiler; a relatively low volume boiler; a plurality of spray nozzles to cool at least one portion of the reaction chamber; a boiler configured to provide coolant to at least one portion of the reaction chamber; a thruster port configured to provide pressure output; or a thruster configured to produce an inert gas/steam output.

According to one exemplary embodiment, the plurality of spray nozzles can serve to at least one of: cool the surface of the reaction chamber uniformly; cool the surface of the reaction chamber to at least several tens of degrees below the average temperature within a cathode of the gaseous electrolysis apparatus; or provide a controlled release of a predetermined amount of coolant, wherein the coolant can include a mist of coolant, liquid, gas, or water.

According to one exemplary embodiment, the heat exchanger can include at least one of: a steam pressure port and steam pressure regulator configured to maintain a sufficiently high steam pressure for at least one application, e.g., to make electricity; a configuration to receive coolant for increased system efficiency during long periods of operation from the header and/or gas handling system cooling chambers; or a coolant supply including high pressure water feed pump to provide coolant to the header's cooling manifold, cooling chambers of the gas manifold system and spray nozzles of the heat exchanger.

According to one exemplary embodiment, the gas manifolds can include, as an enhanced safety measure, a plurality of valves that are normally by default closed, but are configured to be opened and closed to move gas into and out of the reaction chamber.

According to one exemplary embodiment, the gas manifolds can include at least one of: a cooling chamber or water jacket to provide cooling for gas tubing and pipes connected or coupled to the reaction chamber; minimal volumes or amounts of gas external to the reaction chamber where heat is produced, enabling relatively accurate flow control and addressing safety concerns; tanks or containers whose known volume enables small quantities of gas to be determined by calculating pressure, temperature and volume before gas is transferred into or out of the reaction chamber; an acoustic sensor/electronic interface, gas detector, or reaction product sensor, configured to manage gas output with a separator valve and facilitate estimation of quantities of reactant gas being processed; a container configured to temporarily store the reactant gas, and periodically permit extraction from the container; a low-voltage, gas compatible valve, pressure sensor and temperature sensor connected or coupled to the electronic control circuit/subsystem; purge ports which can be used to evacuate gases manually from their containments; or a safety tank/bottle for overpressure protection for transfer through a safety valve or rupture disc of gas from the reaction chamber.

The electronic control circuit (ECC) can include components that enable real-time set-up, control, recording and analysis of apparatus operations, further bridging between laboratory experiments and a commercially useful device. According to one exemplary embodiment, the ECC can include at least one of: an electrolysis apparatus controller subsystem configured to measure at least one sensory output of a plurality of field sensors, record at least one sensory output as sampled data, or store the sampled data on an external device; an electrolysis apparatus controller subsystem configured to store in an off-board, permanent memory using a processor board port or universal serial bus (USB) port coupled to the control system, sampled data that can be analyzed and further configured to train and optimize control system parameters contained in software of the electrolysis apparatus controller subsystem; or an electrolysis apparatus controller subsystem configured to create analog or digital signals to be sent to or from a plurality of field control devices, according to at least one control algorithm output in software, in order to control the state of the reaction chamber as indicated by input devices comprising thermocouples, pressure sensors, and/or an acoustic sensor.

According to one exemplary embodiment, the ECC can include at least one of: series and parallel precision resistors or a precision non-contact probe configured to measure electric current flowing across the reaction chamber; a bipolar (±), variable, high voltage power supply configured to vary the voltage level from the power supply or to adjust the biasing on a transistor type component inside the power supply or to adjust the power supply output resistor network to create a desired level of voltage and current across the anode and cathode; a power supply for the electric heater located inside the anode of the reaction chamber; an electronic separator valve subsystem or acoustic interface that facilitates estimation of quantities of reaction gas processed; a thermocouple measuring temperature inside the reaction chamber; a pressure sensor measuring pressure inside the reaction chamber; a microwave generator coupled to a robust loop or other microwave antenna to provide a high-frequency electromagnetic field inside the reaction chamber; an electric interface with heat exchanger cooling valves to support the reaction chamber cooling process; or a nuclear radiation detector configured to sense a radiation level, analyze or compare the sensed radiation level to predetermined thresholds, store radiation level information and generate a notification.

According to one exemplary embodiment, the ECC can include at least one of: a single-board computer that can include a processor chip with accessory and supporting circuitry, a controller area network (CAN) transceiver chip or port, at least one USB port, an RS 232 serial port, a general-purpose input and output (GPIO), an ethernet physical (PHY) input or an output, interface or port connector and a video graphics association (VGA) display or other output port; an external memory; an analog input extender board; an analog output extender board; a control area network including a digital output module, a digital input module, an analog output module, or an analog input module; a Linux, a Unix, an embedded Linux or Unix, or other operating system (OS); equipment power supplies including isolated 12 and 24 volt DC power supplies; a video display screen or other output device; or input keyboard.

According to one exemplary embodiment, the ECC can include software instructions, which, when executed on a processor can perform functions to at least one of: provide an automated system pre-startup sequence; provide automated charging of mixing chamber and/or reaction chamber; control reaction chamber dynamics during startup and/or operation; provide automatic fail-safe shut down; provide long term, automatic adjustment of control system output signals to the process to facilitate the empirical discovery of the signal levels required to initiate, control or maintain a desired reaction; provide for output or display of process measurements for real-time human observation; enable a human interface with the process through display of interactive video screens where an operator initiates or terminates a process or adjusts specified control system parameters to change the speed, nature or intensity of a process; provide detection of significant system events or combinations of events, measured from at least one sensory input field device, or provide a corresponding threshold table; or provide a collection of data from at least one, or all sensory input devices, sampled or stored on an external device connected or coupled through a processor board, port or USB port.

According to one exemplary embodiment, the ECC can include software instructions, which, when executed on a processor, can perform functions to at least one of: accept one or more input(s) and calculate one or more operating output(s) to control hardware automatically and in such a manner to satisfy engineer-specified setpoints; adapt to varying system conditions so as to appropriately adjust internal operation parameters and where the same specified operations or functions comprise a multiple-input and multiple-output (MIMO) control process; adapt to varying system conditions using a proportional-integral-derivative (PID) controller, a modified PID controller, a least means squares (LMS) algorithm, a Gradient Search by a Steepest Descent algorithm, a Box-Jenkins algorithm, a Hammerstein-Wiener System estimator, a Radial Basis Network system, or a Principal Component Analysis (PCA) system.

According to one exemplary embodiment, the ECC can also include software instructions, which, when executed on a processor can perform functions to at least one of: perform system identification (ID) processing using at least one system ID process; efficiently generate informative data for fitting a mathematical model of the system; provide sufficiently rapid response time for precision control of discrete quantities of deuterium, hydrogen and carrier gas molecules supplied to the reaction chamber during apparatus operation; and control a reaction chamber exhaust valve, configured as a fail-safe to exhaust pressurized reaction chamber gases in event an input device measurement exceeds a safety threshold.

BRIEF DESCRIPTION OF THE DRAWINGS

The embodiments are described with reference to the drawings in which like elements are denoted by like or similar numbers and in which:

FIG. 2, which includes FIGS. 2A-C, illustrates an alternative exemplary embodiment according to the present disclosure of the manner in which a heat exchanger module facilitates and controls a thermal gradient through the cathode module and the wall of the reaction chamber module. The thermal gradient, according to an exemplary embodiment, facilitates production of output heat as a continuous process, extracting the reaction heat as, for example, steam for application to an external electric generator, space heater or a mechanical process.

FIG. 2A depicts an exemplary cutaway one half view of an exemplary reaction chamber illustrating an exemplary thruster port for inert gas or steam, and illustrates the heat exchanger or boiler, according to an exemplary embodiment.

FIG. 2B depicts a zoomed in portion of the exemplary reaction chamber of FIG. 2A, according to an exemplary embodiment.

FIG. 3A is an illustration, according to an exemplary embodiment, which is helpful in understanding connection or coupling of the exemplary gas manifolds to the reaction chamber so as to minimize gas volume external to the reaction chamber and remove heat from the gas manifolds according to an exemplary embodiment.

FIG. 3B depicts an exemplary top perspective view of an exemplary hydrogen/deuterium gas supply manifold, according to an exemplary embodiment.

FIG. 3C depicts an exemplary perspective view of an exemplary carrier gas supply manifold, according to an exemplary embodiment.

FIG. 3D depicts an exemplary perspective view of an exemplary reaction gas product collection manifold, according to an exemplary embodiment.

FIG. 3E depicts an exemplary perspective view of an exemplary gas measurement and evacuation manifold according to an exemplary embodiment.

FIG. 4A provides an electrical control connectivity diagram, according to an exemplary embodiment.

FIG. 4B provides an example process and software architecture, according to an exemplary embodiment.

FIGS. 6A-6F, collectively referred to as FIG. 6, demonstrate an example construction of components for an example reaction chamber, header, high temperature feedthroughs, anode, cathode part, and separator valve/acoustic sensor, respectively, according to example embodiments of the present disclosure.

DETAILED DESCRIPTION OF THE PREFERRED EMBODIMENTS

Figure 1A:
FIG. 1A indicates a configuration for an exemplary reaction chamber and flange for attachment of the modular header of the exemplary embodiment.

An exemplary embodiment of the disclosure sets forth improvements to an exemplary gas electrolysis system enabling such a system to bridge the gaps between laboratory apparatuses and a commercially useful device, and to be manufactured by industry. The present disclosure sets forth features enabling these exemplary industrialized systems to have large power handling capabilities and address well-known problems with the state of the art and conventional solutions, such as the possibility of hydrogen recombination with oxygen, the relatively slow loading of gas into cathodes, inefficient designs and potential dangers of loaded, pressurized bulk material, while being regulated for ease of operation.

Information in the previous and the following paragraphs includes preferred embodiments and various alternative exemplary embodiments for the disclosure, operational procedures for the disclosure and information on modes of practicing the disclosure. The exemplary improvements discussed, moreover, support key design parameters of the exemplary apparatus, such as, e.g., but not limited to, sufficient cathode reaction material for planned power output, relatively high operating temperature and pressure, and minimal volumes in the gas manifolds for safety. This information enables the subject matter of the claims (35 USC § 112) and teaches/shows how to use this invention (35 USC § 112(a) and pre AIA 35 USC § 112). FIGS. 1-6, in accordance with 37 CFR § 1.121(d), include a depiction of each claimed component.

INTRODUCTION

In complementing previous advancements, the basis for the present disclosure is to bridge the gaps between laboratory experiments and a commercially useful device for producing energy at levels of practical interest and that can be manufactured by industry. An objective is to demonstrate that hundreds of watts of heat can be produced in cubic centimeters of specific reaction materials. For practical applications, this can require apparatuses that sustain on the order of 10 to the exponent 16 nuclear reactions per second, assuming each reaction nets several million electron volts (MeV) of energy. The exemplary design disclosed is based upon use of pressurized hydrogen and/or deuterium gas and includes, for example: an example reaction chamber or reactor whose purpose is to enclose active high temperature and pressure system components; an example closure, otherwise known a "header," whose purpose is to seal the reaction chamber from the outside atmosphere and provide electrical connections between components within the reaction chamber and external components; an example heat exchanger to extract heat from the outer surface of the reaction chamber; an example gas handling system that can include separate gas manifolds to control gas flow in and out of the reaction chamber; and an example electronic control circuit (ECC) electrically connected to, or coupled to, the header and gas handling system. One of the example gas manifolds enables either deuterium or hydrogen, or both, to be provided in measured amounts to the reaction chamber. One of the example gas manifolds enables reactant gas to be stored and periodically extracted from the system. The example header can contain a cooling apparatus to enable electrical feedthroughs to be cooled to increase their operational lifetime and can provide mechanical support for other components within the reaction chamber. Internal to the reaction chamber, an embodiment of the design can include an anode, which can include an internal heater, and an example removable cylindrical cathode around the anode. The electronic control circuit (ECC) can enable real-time set-up, control, recording and analysis of apparatus operations. The apparatus is a complex system comprising (or including) these key components.

Specific and substantial utility (as required by 35 USC § 101) is ample, and includes using the disclosed system or apparatus to first provide for laboratory applications and investigation and testing, in an example embodiment. The example system of the claimed invention has various example potential uses, including use in the study of, and testing of, electrolysis reactions, and cooling and heat transfer via exemplary heat exchangers and the like of various materials of exemplary embodiments. The capability of the example header to cool example feedthroughs can advantageously enable longer periods of operation between maintenance, in an exemplary embodiment. The capability of the header to integrate internal reactor components into the lower side of the header supports apparatus maintenance, in an exemplary embodiment. The example co-disposed heat exchanger around the example reaction chamber has an exemplary purpose of enabling useful power to be extracted in an efficient and safe manner, and is, e.g., removable for maintenance. The example heated anode has an exemplary purpose of enabling temperature of reaction material within the cathode to be raised above its Debye temperature. The heated anode within the reaction chamber and heat exchanger can support thermal diffusion of deuterium and/or hydrogen gas into the cathode reaction material, in an exemplary embodiment. The thermal diffusion gradient, along with electric fields and gas pressure, are considered to be highly important in promoting gas transport into and through the reaction material, in an exemplary embodiment. The example cathode in one embodiment can include a modular, removable component and can be encased in a metal supporting sleeve to facilitate removal/replacement during maintenance. An example purpose of one of the gas manifolds is to enable control of the necessarily very small amounts of hydrogen and/or deuterium gas that can be provided to the reactor. One of the other manifolds is designed to enable reaction product gases to be quantified and stored, in an exemplary embodiment. The example ECC enables control of key physical processes and parameters within the reactor, such as, e.g., but not limited to, anode temperature, gas pressure, electric field strength, and type and rate of gas diffusion, as well as controlling supporting components, etc. A person of ordinary skill in the art would, therefore, appreciate reasons the invention is useful based on these and other benefits. These capabilities support the need for long operation periods, ease of maintenance and safe operations. An example modular systems approach for component design can enable many numbers of industries to manufacture, install, repair and otherwise support these objectives.

Early concepts related to design of the apparatus are provided in a paper on "Critical Factors in Transitioning from Fuel Cell to Cold Fusion Technology," by T. McGraw and R. Davis in August 1998, which depicts the simplistic arrangement between the anode and cathode and indicates the importance of a long cathode with relatively large surface area, a thermal gradient combined with gas pressure and electric field in loading the cathode, a collection bottle for reaction product helium, and of safety as a primary concern. Additional information related to the design is presented in U.S. Pat. No. 6,248,221 B1, "Electrolysis Apparatus and Electrodes and Electrode Material Therefor," by Davis et al., Jun. 19, 2001, which discloses a consolidated cathode reaction material including or comprising nanocrystalline particles, a porous insulator reaction vessel between the anode and cathode, a microwave type of starter/initiator and an electronic control circuit that controls electricity between the anode and cathode. Concepts related to design of the apparatus are presented in the draft of a paper on "Key Issues Related to Industrialization of LENR-Based Space Propulsion," by M. Chawla and R. Davis that was developed in April 2016 for the Space Technology & Applications Industrial Forum (STAIF) and emphasizes that fuel quantity supplied to the reaction material needs to be controlled to limit reaction rate in the reaction material and that heat must be removed efficiently. An early gas loading concept is discussed in patent application WO 95/20816, "Energy Generation and Generator by Means of Anharmonic Stimulated Fusion," by S. Focardi et al., Aug. 3, 1995, that reports on use of electricity through a high-temperature coil to load and heat reaction material above its Debye temperature to produce fusion between hydrogen and deuterium and on methods to initiate the fusion reactions. By comparison, and demonstrative of the novelty of the disclosure under 35 USC § 102 and the nonobviousness of the disclosure under 35 USC § 103, these sources of information do not disclose a header according to the disclosure, where feedthroughs are cooled and that provides for integration of internal reactor components; a heat exchanger that is modular and removable; a modular anode with an internal heater; a modular, removable cathode encased in a metal supporting sleeve; gas manifolds that are able to control very small amounts of gas to the reactor and quantify amounts of reaction gases produced; an electronic control circuit that enables control of the very small amounts of hydrogen and/or deuterium gas provided to the reactor and the quantification of reaction product gases; nor the means to remove heat efficiently, according to an exemplary embodiment. These elements of the instant application described herein provide significant differences and depend upon unique technical concepts in the design and were not previously self evident to a person having ordinary skill in the art. The disclosed invention is novel. This disclosure was also made by parties in the joint research activity that includes the same parties for the Critical Factors and Key Issues papers and U.S. Pat. No. 6,248,221 B1. There has been no known teaching, suggestion or motivation by others to combine the above or other references in the manner described in this application.

Internal to the example reactor, the apparatus is viewed to operate by "gas electrolysis" or "gaseous electrolysis", as this description most effectively captures the essence of electrochemical processes in the volume between the anode and cathode and that involves a mixture of molecules, ions and electrons, pressurized hydrogen and/or deuterium gas, elevated temperatures and strong electric fields. Supporting data are provided in a great number of scientific works since the late 1800s to the present day regarding electrical conduction through hydrogen gas. See the paper, "On the Electrolysis of Gases," by J. J. Thomson and pages 270-4 in Chapter VIII and pages 293-4 in Chapter IX in the text on "Theory of Gaseous Conduction and Electronics," by F. A. Maxfield and R. R. Benedict. High voltage breakdown or avalanche discharge through the gas is not desired. The Paschen curve for hydrogen and Townsend criterion can be used to ensure that sufficiently low voltages and high gas pressures are used to prevent breakdown. See pages 188-190 in "Introduction to Electrical Discharges in Gases," by S. C. Brown.

Physical similarities exist between concepts for gas-based and liquid-based LENR apparatuses whose understanding can thereby support the transition from liquid to gas LENR systems. Each contains cathodes where reactions can be made to occur, anodes, electrolytes (i.e, gas or liquid) and direct (dc) drive currents. A liquid-based system is concerned with anions and (e.g., $D^+$ and/or $H^+$) cations, their movement in a liquid electrolyte and cathodic interactions. Gas-based concepts, by comparison, are concerned with mechanisms that can form positive ions from (e.g., deuterium and hydrogen gas) molecules, their movement to the cathode and cathodic interactions. Several ion forming mechanisms (elastic, excitation, ionization) can be considered, but the most important is due to collisions of thermal electrons with gas molecules. Ionization cross sections vary in a non-linear manner. Energies of scattered electrons are frequently increased in the scattering process. The resulting mixture can contain many different species of ions and molecules that interact with various cross sections as described in "Cross Sections and Swarm Coefficients for $H^+$, $H_2^+$, $H_3^+$, H, $H_2$ and $H^-$ in $H_2$ for Energies from 0.1 eV to 10 keV," by A. V. Phelps. The positive species can be accelerated toward the cathode at different rates determined by their mass and charge.

FIGS. 1A-1D, collectively referred to as FIG. 1, illustrate an exemplary embodiment of a modular header according to the present disclosure which can provide a relatively cool temperature environment for exemplary electrical feedthroughs to support long-term operation of this apparatus.

FIG. 1A illustrates an embodiment of a portion of an exemplary reaction chamber 122 (described further with reference to FIG. 1D) including a flange portion with a plurality of openings for coupling to an adjacent header 120 of the exemplary apparatus; also shown are exemplary ports for coupling the reaction chamber to one or more gas manifolds as described further herein.

Figure 1B:
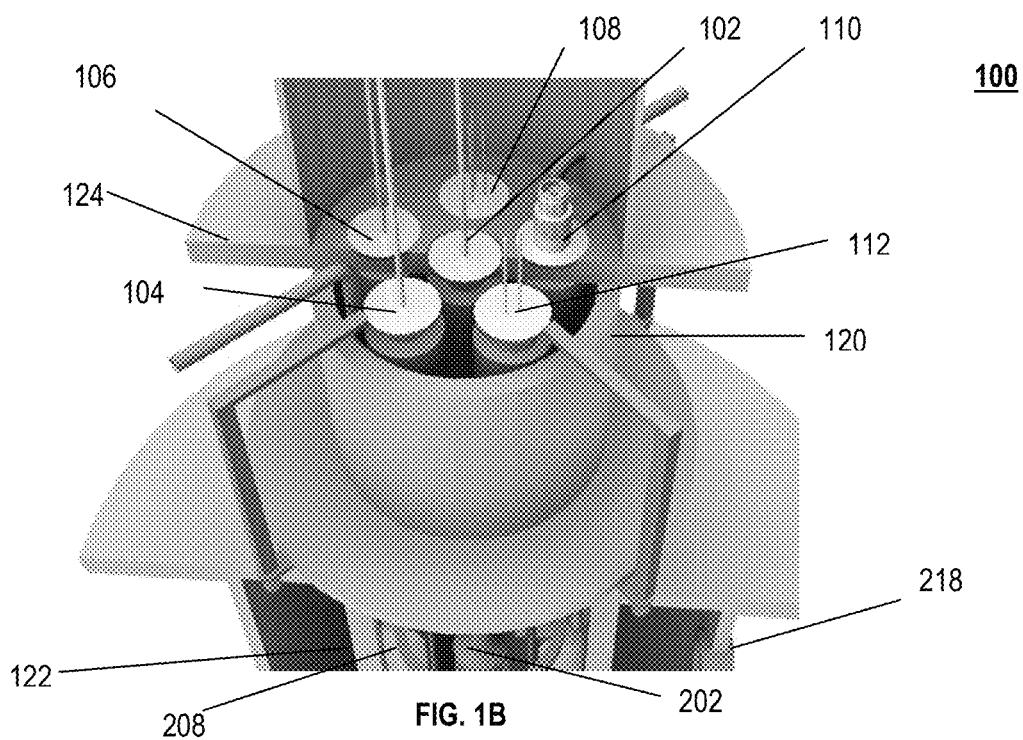
FIG. 1, which includes FIGS. 1A-1D, collectively illustrates an exemplary embodiment of a modular header according to the present disclosure which can provide a relatively cool temperature environment for exemplary electrical feedthroughs to support long-term operation of the system, according to an exemplary embodiment.

FIG. 1B depicts an exemplary cut-away top view of an exemplary header assembly 100 including various exemplary feedthroughs 102-112, including an exemplary copper wire anode connection 102, anode heater wire connections 104 and 106, an exemplary 4-wire connection 108, an exemplary microwave antenna connection 110, and a thermal sensor connection 112 as may be provided in a preferred embodiment of the header. The anode in a preferred embodiment can include a heater, such as, e.g., but not limited to, a cartridge-type heater encased in the anode (for reference, see, e.g., Dalton Electric Heating Company model W6C120).

Also shown in FIG. 1B is an exemplary header 120, exemplary reactor or reaction chamber 122, exemplary header cover or cooling plate 124, exemplary thruster/steam port 218, and partial view of cathode 208 and anode 202 with internal heater discussed further below, in an exemplary embodiment.

An exemplary embodiment of the exemplary header 120 for the exemplary electrolysis apparatus 100 can enable the exemplary reaction chamber 122 to be opened and closed for replacement of internal parts. The exemplary cathode 208 can be replaced when the cathode no longer operates efficiently as may be evident when anode 202 current or anode-to-cathode voltage does not meet allowed threshold values, or the system's coefficient of performance (COP) is determined to be insufficient. The exemplary header 120 can include an exemplary header cover, closure gasket and/or flange that can serve as an exemplary main seal for the apparatus and can be designed to maintain specified mechanical integrity and reliability during many temperature and pressure excursions, according to an exemplary embodiment. Standard operating pressure and temperature within the exemplary reaction chamber 122 are hundreds of pounds per square inch and hundreds of degrees centigrade, according to an exemplary embodiment. During exemplary maintenance and startup periods, according to an exemplary embodiment, the bottom of the exemplary header 120 along with the inside of the exemplary reaction chamber 122 can be required to be exposed to high-temperature, pressure, and vacuum cycles to remove oxygen and other gaseous impurities from the reaction chamber 122. An exemplary carrier gas, e.g., argon, can be introduced to physically flush the system, according to an exemplary embodiment. During startup, pressure in the exemplary reaction chamber 122 can then be required to increase in steps as, first, deuterium and, then, hydrogen are made to enter the reaction chamber 122, according to an exemplary embodiment. According to an exemplary embodiment, the reaction chamber 122 can be required to operate at high pressure and temperature over long periods of time, wherein additional gas can be periodically introduced to maintain the heat energy producing process.

According to one important aspect of this disclosure, the header 120 can contain a thermally cooled plate or header cover 124 through which one or more feedthroughs 102-112 can be mounted, according to an exemplary embodiment. The exemplary feedthroughs 102-112 can be standard, commercially-available, high voltage, power and coaxial electric feedthroughs, and can include electrical conducting members and insulating material such as alumina or glass, according to an exemplary embodiment. These feedthroughs 102-112 can be manufactured by metallization, high temperature consolidation and/or vacuum brazing methods known to those skilled in the art of hermetic ceramic-to-metal sealing technology, according to an exemplary embodiment. See, for example, U.S. Pat. No. 4,174,145, "High Pressure Electrical Insulated Feed Thru Connector," Nov. 13, 1979; U.S. Pat. No. 4,593,758, "Hermetically Sealed Insulating Assembly," Jun. 10, 1986; and U.S. Pat. No. 5,273,203, "Ceramic-to-Conducting-Lead Hermetic Seal," Dec. 28, 1993, the contents of which are incorporated herein by reference in their entirety. For reference, see, e.g., Solid Sealing Technology website at www.solidsealing.com. The exemplary feedthroughs 102-112 can, in an exemplary embodiment of the disclosure, maintain their integrity during the above described variable and long, elevated pressure and temperature environment, according to an exemplary embodiment. The use of the exemplary feedthroughs 102-112 in headers/isolators for these types of apparatuses containing high-pressure hydrogen at high temperature has never before been previously proposed, according to an exemplary embodiment. In the relatively cool temperature environment provided by the cooling plate 124, however, the feedthroughs 102-112 can be able to operate consistently to support long-term operation of the system, according to an exemplary embodiment.

Figure 1C:
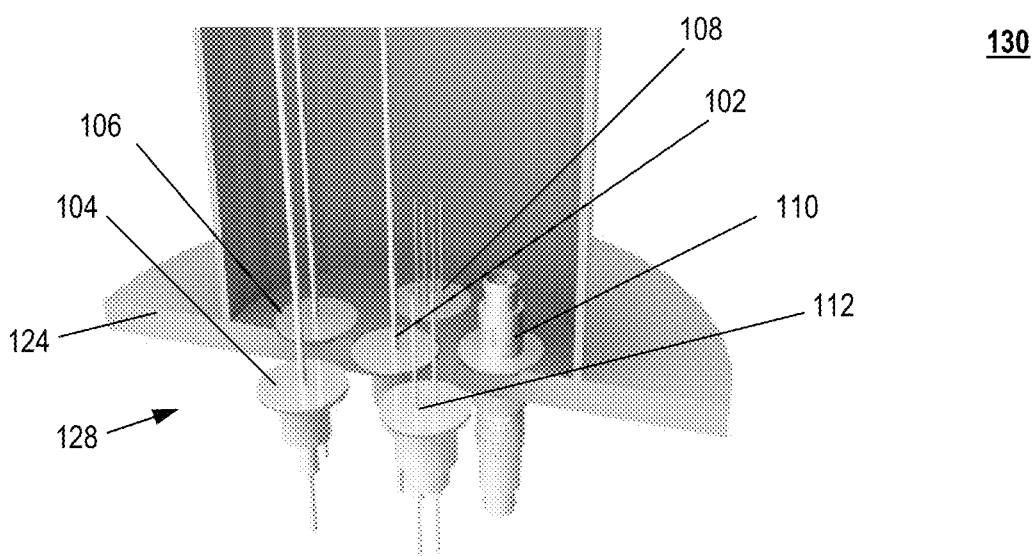
Figure 1D:
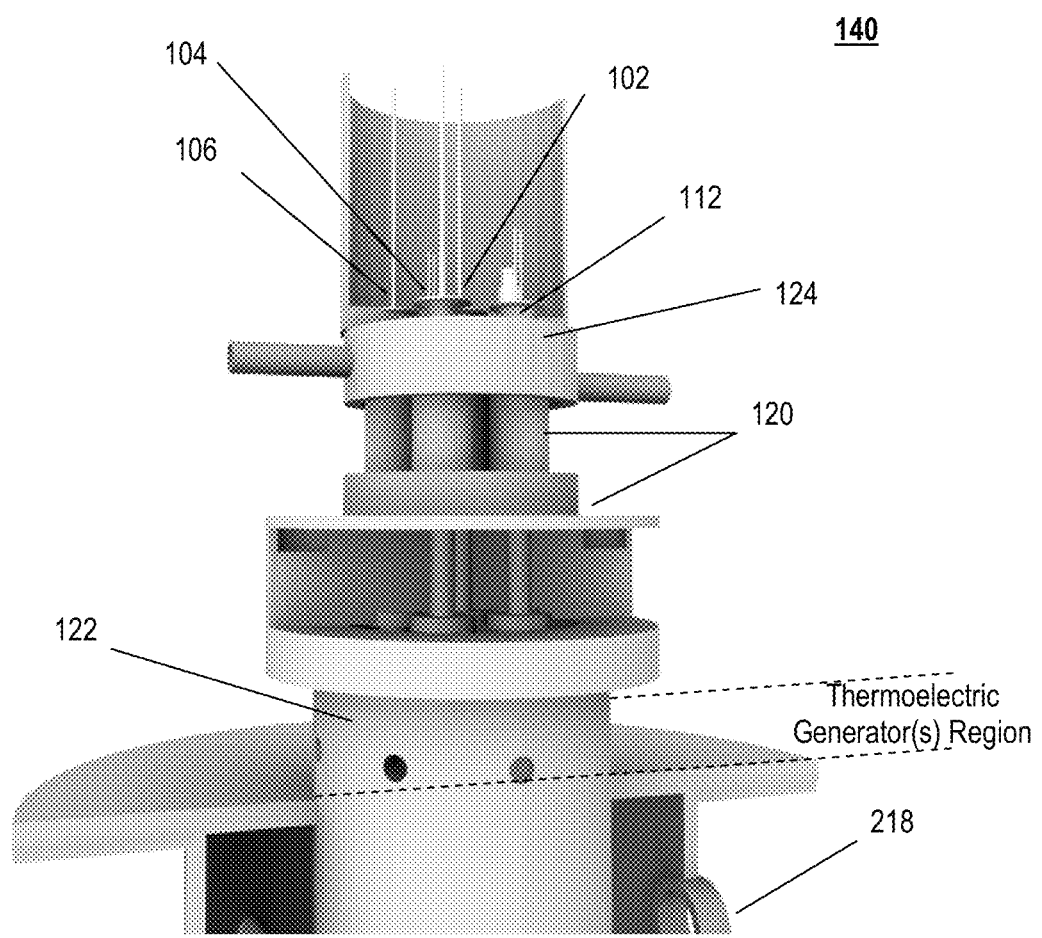

FIG. 1C depicts an exemplary cutaway view 130 of exemplary feedthroughs 102-112 in an exemplary configuration. The feedthroughs 102-112 can be permanently mounted through the exemplary thermal cooling plate 124, for example, by tungsten inert gas (TIG) welding, in an exemplary embodiment. In a preferred embodiment, the feedthroughs can be built so that the pressure side 128 of each feedthrough 102-112 can be towards the inside of the reaction chamber 122 (not shown), in an exemplary embodiment. Connections or couplings, in an exemplary embodiment, can be made from the pressure side of the feedthroughs to the anode, heater, microwave antenna, thermal sensor or other desired electrical device(s) as may be located within the exemplary reaction chamber 122. Each feedthrough 102-112 can also be connected or coupled with external electronic control circuitry (not shown) above the header cover/cooling plate 124, in an exemplary embodiment. Alternatively, in one exemplary embodiment, the feedthroughs 102-112 can contain an exemplary circular disk flange header cover or cooling plate 124, which may be continuous around the circumference of the feedthroughs 102-112, to enable the feedthroughs 102-112 to be mounted as shown in FIG. 1D. In an alternative configuration, the feedthroughs 102-112 can be mounted with exemplary pressure gaskets or seals through the thermal cooling plate 124 so that the feedthroughs 102-112 can be replaced when damaged, in an exemplary embodiment. Alternatively, in another exemplary embodiment, each feedthrough 102-112 can first be welded into a screw-type metal socket or ferrule which can be installed in the mounting plate 124 with a suitable gasket. Again, the exemplary pressure side 128 of each feedthrough 102-112 can be directed towards the inside of the reaction chamber and connections or couplings can be made from the pressure side of the feedthroughs 102-112 to elements within the reaction chamber 122, in an exemplary embodiment. In relatively low pressure configurations, it is considered possible, in another exemplary embodiment (not shown), for the feedthroughs 102-112 to be mounted with pressure gaskets or seals through the thermal cooling plate with their pressure side reversed so that the pressure gaskets or seals can be more easily able to be replaced. In this latter exemplary case, the pressure side of each feedthrough can be towards the outside of the reaction chamber 122 and connections or couplings can be made from the lower side of the feedthroughs 102-112 to elements within the reaction chamber 122 (not shown). All such alternative configurations can be thereby considered to be within the scope of this patent.

The lower side of the header 120 can contain exemplary robust, thick insulators that can electrically isolate and provide mechanical support for the electrical connections or couplings and can, e.g., for improved operation and safety, ensure that gas in the reaction chamber is concentrated near the cathode and minimize the volume where gas could reside, in an exemplary embodiment. The exemplary upper insulator can provide electrical isolation between connections, in an exemplary embodiment. It is particularly important, for example, in an exemplary embodiment, to electrically isolate the anode 202 connection or coupling 102 from all structural, control and sensory elements where stray currents can be induced to system grounds, earth grounds, power supply voltage sources or other control system voltage sources. The anode-cathode current, therefore, can be measured and thereby controlled with maximum accuracy, in an exemplary embodiment. The exemplary lower insulator 1402 (see FIG. 2A) can provide mechanical support for a microwave antenna, anode 202 and thermal sensor, in an exemplary embodiment. The lower insulator 1402 can also contain an exemplary reflective heat shield or baffle on its lower surface to reflect infrared energy (heat) back down into the reactor volume, in an exemplary embodiment. In an embodiment, these insulators can be attached to the header 120 closure flange. The insulators, anode, microwave antenna, thermal sensor, etc. can thereby be able to be installed and removed as an integral unit, in an exemplary embodiment. In alternative embodiments, the top of the header 120 can be opened and closed separately from the insulators, subsequent to installation of the insulators with anode 202, microwave antenna, thermal sensor, etc. into the reaction chamber 122.

According to an exemplary embodiment of this disclosure, the header 120 can contain a cooling manifold or water jacket that can provide cooling for the thermal cooling plate. See FIG. 1D. The cooling plate 124 with attached feedthroughs 102-112 and installed conductors can thereby be required to make thermal contact with the cooling manifold. The cooling plate 124 can be attached and/or mechanically coupled by a strong, continuous and/or leak-proof weld to prevent gas from escaping the reaction chamber 122 through the header 120, in an exemplary embodiment. Alternatively, for lower pressure applications the cooling plate 124 can be attached, e.g., with suitable bolts and/or a gasket that can prevent gas from escaping from the reaction chamber 122, in an exemplary embodiment. In such a case, maintenance may be performed by removing the cooling plate 124, replacing a damaged feedthrough 102-112 or other component and then re-assembling the header 120, in one exemplary embodiment. Exemplary ceramic tube insulators, in an exemplary embodiment, can be installed around the conductors extending through holes in the cooling manifold to provide electrical isolation and minimize the volume where gas could reside. The flow design of the exemplary cooling manifold advantageously can provide a large surface area and liquid volume for transfer and removal of heat from the header 120, resulting in lower local temperature both adjacent to the feedthroughs 102-112 or feedthrough assemblies and for the header seal, in an exemplary embodiment. Furthermore, an electronic temperature measurement device (e.g., thermocouple) can be mounted on the cooling plate 124 where the temperature can be monitored and maintained at a relatively constant value during long, high temperature operational periods, in an exemplary embodiment. The amount of heat removal can be adjusted using temperatures from the thermocouple and coolant flow rate to change the coolant's volume through the cooling manifold.

Design of the header 120 can include several exemplary safety features, in an exemplary embodiment, in addition to mechanical integrity of an exemplary embodiment of the present disclosure. The closure mechanism, in an exemplary embodiment, bolting the header to the reaction chamber flange, can be made to operate so that required torques on the bolts can be checked. Gas pressure that could decrease due to a leak through a feedthrough 102-112 or accumulate at the edge of the header flange can also be monitored by a separate electric gauge, in an exemplary embodiment. This can be made possible, both by a sealed cover over the feedthroughs 102-112 attached to the top of and is part of the header and by a removable, wide vertical gasket that can surround and lap across the header flange and reaction chamber flange and that can be tightly secured by an exemplary separate mechanical support band around the header flange and the reaction chamber flange, in an exemplary embodiment. Electrical conductors extending from the feedthroughs 102-112 to the external electronic control circuitry can be made to pass through the gas safety cover, in an exemplary embodiment. The cover can press fit to the main part of the header 120 and can be easily removed for maintenance, in an exemplary embodiment. Either an electronic pressure or gas sensor/detector can be located within the safety cover and can be used to detect any gas leak through the header 120 and thus can be configured to electronically provide an alert signal to the apparatus operator.

Figure 2A:
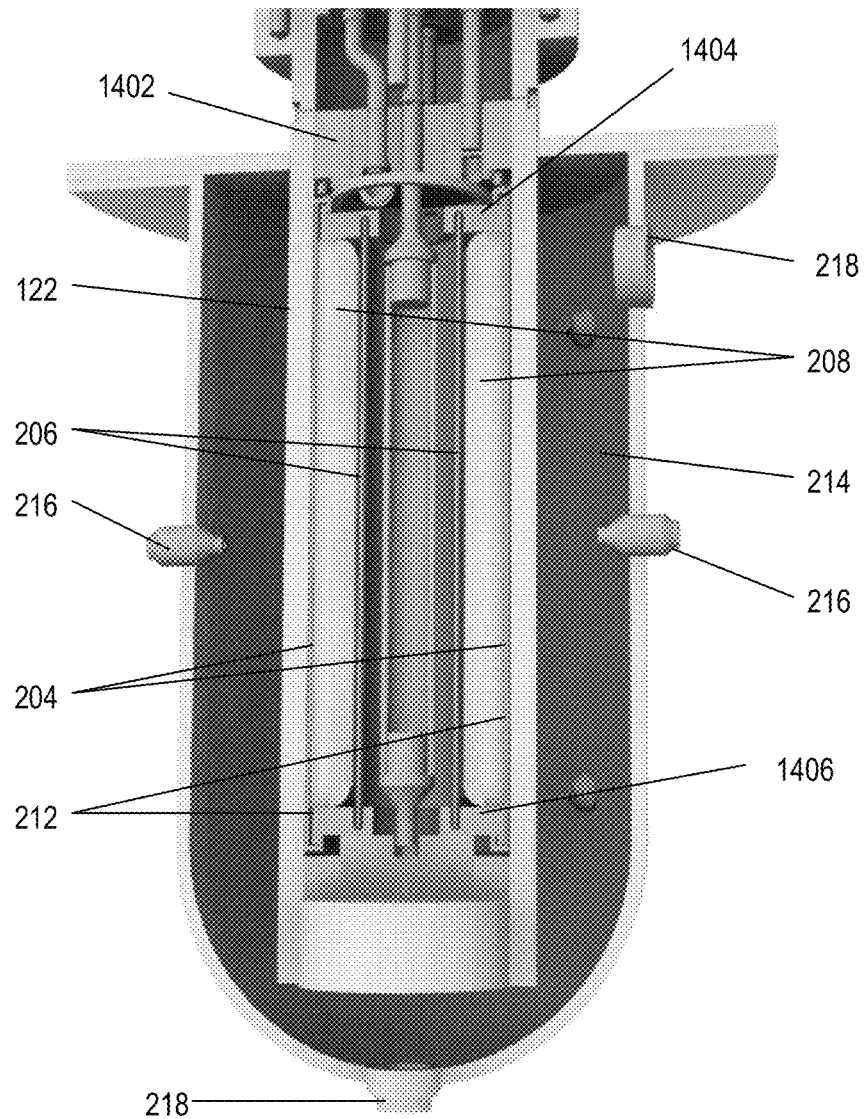

Referring specifically to FIG. 2A, according to an exemplary embodiment, the coaxial cathode 208 where heat can be produced can be located within the reaction chamber 122 and can touch the reaction chamber's inner wall 204 to facilitate heat conduction through the reaction chamber wall 122. An aspect of an exemplary embodiment can be to enhance the thermal diffusion gradient between the anode 202 through the cathode 208 reaction material and reaction chamber wall 122, and, can thereby, facilitate thermal diffusion of gas through the cathode 208 over long periods of operation, according to an exemplary embodiment. Heating up the anode in the center of the cathode heats up the inner part of the cathode and the gas moves with the thermal gradient, and through the cathode by thermal diffusion, according to an exemplary embodiment. Also see cutaway view 230 of FIG. 2B.

The cathode in a preferred embodiment can be a hollow-shaped cylinder, with a central cavity configured to receive the anode. The cathode in a preferred embodiment can be encased by an exemplary outer metal (e.g., stainless steel) sleeve 212 and can be bounded at its base and top with exemplary ceramic insulator endcaps 1404 and 1406. The cathode can contain a porous insulator reaction vessel 206 on its inner surface facing the anode. The cathode is electrically grounded and can be co-disposed (or optimally coaxial) in the reaction chamber, according to an exemplary embodiment. In an exemplary embodiment, the upper ceramic end cap insulator 1404 can contain exemplary holes for reaction gases to escape. The cathode in a preferred embodiment can be modular and/or easily removable as a component. An exemplary cathode can include metal powder or metal particles in an exemplary embodiment. According to another exemplary embodiment, the edges of this reaction material part facing the anode can be tapered or curved to help prevent high voltage breakdown between the anode and cathode. In an exemplary embodiment, the particulate material of which this part is constructed can be optionally of a shape to provide for high packing density and enable consistent cathode industrial production. In an exemplary embodiment, the powder/particle size can be a small medial size of about on the order of microns, with a tight Gaussian distribution around the medial size, in one exemplary embodiment. In an exemplary embodiment, the cathode's material can be consolidated metal powder with high theoretical density in an exemplary embodiment. In an exemplary embodiment, the cathode's consolidated material can also have a specified low value of porosity (i.e., the inverse of percent consolidation) and determined to be a value between 0 and 20% in an exemplary embodiment. According to one aspect of the present invention, the cathode's particles can be formed from a single element or multiple elements selected from the group consisting of Fe, Ni, Cu, Mo, Cr, Co, Mg, Ag, and W. In an exemplary embodiment, the cathode can be made of high purity nickel, due to its relatively high abundance on the earth which can support a need for low-cost materials. Additional details on a consolidated cathode, which in an exemplary embodiment can be configured to have a co-axial cylindrical shape, are described in U.S. Pat. No. 6,248,221 B1, issued Jun. 19, 2001. Transport of gas within the cathode can be treated by assuming that deuterium and/or hydrogen can be subject to a superposition of electro- and thermo-transport forces that can cause the gas(es) to move constantly through the reaction material, in one exemplary embodiment.

Another aspect of an exemplary embodiment of the present disclosure can be to provide an exemplary coaxial heat exchanger surrounding the reaction chamber that can provide an exemplary cooling medium (e.g., but not limited to, water) to remove heat from the outer surface of the reaction chamber 122 wall, in an exemplary embodiment. A portion of the annular space surrounding the reaction chamber 122, in an exemplary embodiment, can form the heat exchanger (e.g., steam generator) 214 of the apparatus as depicted in cutaway view 200 of FIG. 2A, in one exemplary embodiment. Exemplary thruster/steam ports 218 are further illustrated in FIGS. 2A and 2C, in one exemplary embodiment. The heat exchanger 214 outside the reaction chamber 122 heats up from the reaction chamber's outer surface and the heat in the heat exchanger 214 can heat the water or other liquid, boiling the liquid into steam to turn a turbine, use as thrust (via exemplary thruster port 218), and/or other heating or power applications as discussed herein, in various exemplary embodiments. The shell and fittings of the heat exchanger 214 (shown in FIG. 2A) advantageously can be made of corrosion-resistant steel, in an exemplary embodiment, for long duration, high temperature operation. According to a preferred aspect of the disclosure, the heat exchanger 214 can be a relatively low volume flash boiler, which can be engineered to provide a mist of water or other liquid coolant to the outer surface of the reaction chamber 122. Although flash boilers have previously been widely used in other applications, their use in these apparatuses, in an exemplary embodiment, has never before been proposed. Advantageously, the boiler, in a preferred embodiment, can include a sufficient number of spray nozzles 216, (see, e.g., FIGS. 2B and 2C) to cool the surface of the reaction chamber 122 uniformly several tens of degrees below the average temperature within the cathode 208 of the electrolysis apparatus to support the thermal diffusion process. Cooler water can be provided during start-up, and can support the thermal diffusion process described above, in an exemplary embodiment. An exemplary input for the heat exchanger/boiler advantageously can also be designed to receive coolant that can pass through the header assembly 100 and cooling chambers 302 of the gas manifold system described further with reference to FIGS. 3A-E during long periods of operation for increased system efficiency, in an exemplary embodiment. The exemplary coolant supply can contain one or more high pressure water feed pumps to provide sufficiently high pressure coolant to the cooling manifold of the header, cooling chambers 302 of the gas manifold system, and spray nozzles of the boiler/heat exchanger 214, in an exemplary embodiment. According to yet another aspect of the present disclosure, the boiler, in an exemplary embodiment, can also connect with steam and water pressure regulators to maintain sufficiently high steam pressure and temperature within the boiler as a result of a high cathode operating temperature set-point, in one exemplary embodiment. Electrically or electronically controllable valves, temperature and pressure sensors can be electrically connected or coupled to an electronic control circuit (ECC) 400 (described further with reference to FIGS. 4A-B) to regulate coolant flow through the header 120 and heat exchanger 214 both to support required temperatures for the reaction chamber 122 and to maintain required thrust/steam output for the system, in an exemplary embodiment. The controller can be designed to maintain the cathode 208 above the Debye temperature of nickel (about 200° C.), according to an exemplary embodiment.

The heat exchanger 214, in an exemplary embodiment, can be envisioned to supply steam conventionally in a closed-loop configuration to downstream power applications, some of which can be mobile or transportable. The heat exchanger can enable the weight of cooling water to be minimized for these potential applications. The unused steam and condensate can be recovered through a condenser and can be returned by the feed pump to the boiler nozzles and/or header manifold. The system necessarily can include various mechanical steam controllers, pressure valves and/or piping for the different applications, according to an exemplary embodiment. Use in spacecraft power applications can require modifications to this basic design.

According to one exemplary embodiment, it is obvious (FIG. 1D) that an exemplary additional benefit can be provided by adding an exemplary thermoelectric generator comprising an exemplary system of thermocouples around at least a portion of the reactor outer surface so that heat from the reactor can also be used to produce electricity directly, according to an exemplary embodiment. (See for example, the article on "Use, Application and Testing of Hi-Z Thermoelectric Modules" by F. A. Leavitt et al, 2007).

Another aspect of an exemplary embodiment of the present disclosure can include providing an exemplary compact, modular gas handling system for the electrolysis apparatus, in an exemplary embodiment. Specific functions of such an exemplary gas handling system (see FIGS. 3A-E) can include: (1) provide gases to the reaction chamber; (2) enable gases to be extracted from the apparatus during operation and maintenance periods; (3) provide temperature and pressure data used to determine quantities of gases supplied to the reaction chamber, extracted gas product and gas removed during maintenance periods; and, (4) monitor pressures and temperatures to maintain safe operating conditions. From the illustrations of the exemplary embodiment depicted in FIGS. 3A-E, it will be appreciated that the gas handling system can be designed and engineered to be rugged, and occupy an exemplary minimum volume so as to support future mobile and transportable applications. It will also be noted that minimal volume of high pressure gas external to the reaction chamber is an important safety aspect, in an exemplary embodiment. The gas handling system, in an exemplary embodiment, can include commercially-available, low-voltage, gas compatible valves, pressure sensors and temperature sensors connected or coupled to an electronic control circuit/subsystem 400 to, along with operation of the heat exchanger 214, control system operation. The temperature sensors, in an exemplary embodiment, can be calibrated resistive devices that can reflect temperature changes as changes in resistance, which preferably can produce a respective voltage drop across the sensor. Pressure sensors can include a transducer, input power connection or coupling and/or an output measurement monitor that can adjust readings for voltage offset and temperature variations, in an exemplary embodiment. Electric current to valves and sensors can be supplied by the electronic control circuit 400 illustrated in FIGS. 4A-B, in an exemplary embodiment.

Figure 3A:
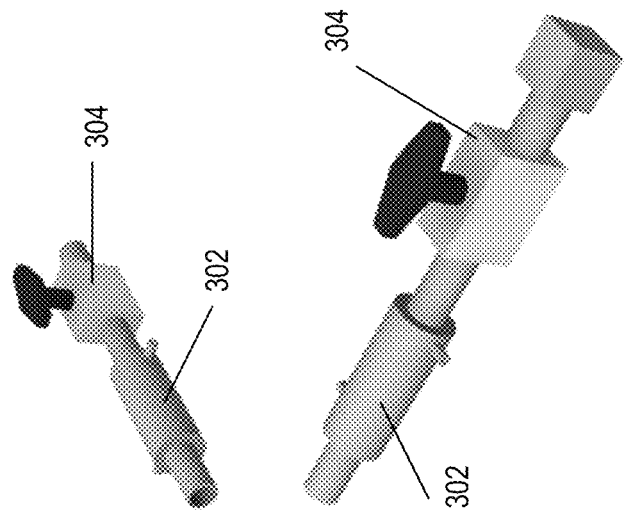
FIGS. 3A-E depict various exemplary illustrations of exemplary gas manifold subsystems according to an exemplary embodiment.
Figure 3A:
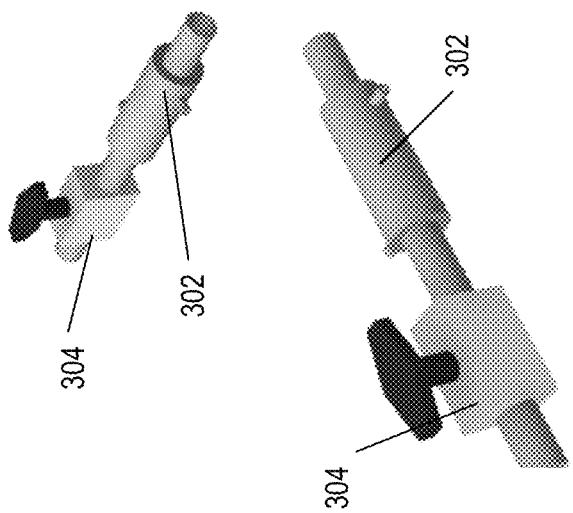

The gas handling system (FIGS. 3A-E) of an exemplary embodiment can advantageously include an exemplary four (4) separate gas manifolds that can control gas flow while minimizing gas volume external to the reaction chamber: 1) an exemplary hydrogen/deuterium gas supply manifold 310, 2) an exemplary carrier gas supply manifold 320, 3) an exemplary reaction gas product collection manifold 330, and 4) an exemplary gas measurement and evacuation manifold 340, in an exemplary embodiment. When installed, each manifold can connect or couple as depicted in FIG. 3A to separate input ports of the reaction chamber 122 (see, e.g., FIG. 1A), and each manifold can be constructed as a continuous unit to prevent air from entering the manifolds or the reaction chamber 122, in an exemplary embodiment. According to one aspect of this disclosure, each of the gas manifolds can include, e.g., but not limited to, a cooling chamber or water jacket 302 as shown in FIG. 3A that can provide cooling for gas tubing and pipes connected or coupled to the reaction chamber 122 of FIGS. 1A and 2A for carrying away heat given out by the reaction chamber, in an exemplary embodiment. These water jackets 302, in an exemplary embodiment, can surround the pipes and tubing so that water through the water jackets can come into contact with the gas tubing and pipes to transfer heat from the tubing and pipes, thereby preventing heat from harming the materials with which the electric valves may be constructed, for example.

Figure 3B:
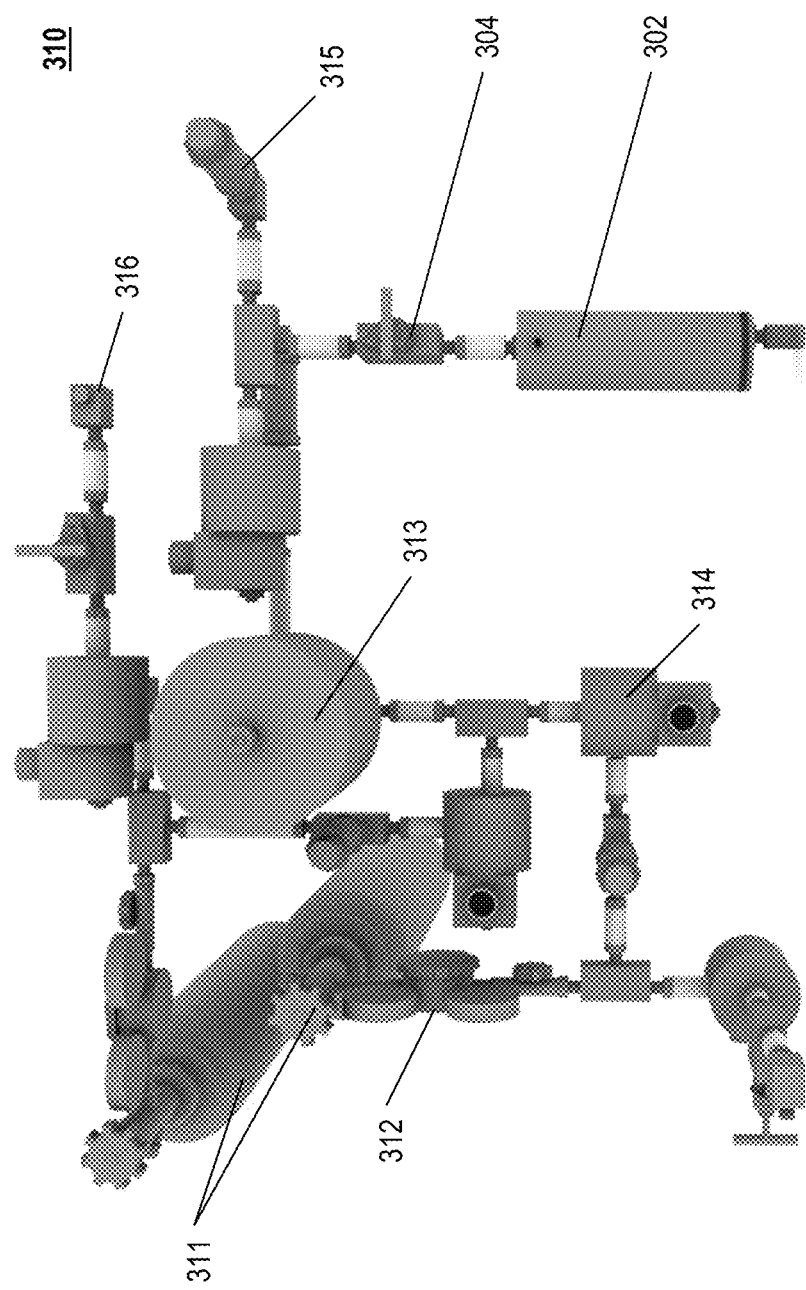

FIG. 3B depicts an exemplary perspective view of an exemplary hydrogen/deuterium gas supply manifold 310, according to an exemplary embodiment. FIG. 3B depicts an exemplary embodiment including, e.g., but not limited to, an exemplary cooling chamber 302, exemplary mechanical valves 304, exemplary hydrogen and deuterium gas canisters 311, exemplary gas regulators 312, an exemplary gas mixing and pressurization container with thermal sensor 313, exemplary electric valves 314, and exemplary pressure sensor(s) 315, in one embodiment.

As illustrated in FIG. 3B, the hydrogen/deuterium gas supply manifold 310, in an exemplary embodiment, can enable predetermined quantities of hydrogen and deuterium gas to be admitted into the reaction chamber of the electrolysis system, in an exemplary embodiment. The exemplary gas supply manifold can be designed and engineered to contain a relatively low volume of gas and to provide appropriate quantities to the reaction chamber 122, in an exemplary embodiment. Exemplary separate connections and/or couplings can be provided to high-pressure, high purity gas bottles, such as hydrogen and deuterium bottles, which sources can be controlled by separate mechanically and/or by electrically controlled valves 314. According to another aspect of the present disclosure, the exemplary gas supply manifold 310, in an exemplary embodiment, can be required to operate in short, incremental steps due to the small quantities of gas involved in the heat-producing reactions, in an exemplary embodiment. With hundreds of watts of heat from cubic centimeters of reaction material, only approximately 10 to the exponent 16 molecules per second are needed. For this reason, but advantageously as an enhanced safety measure, the valves can be engineered to be normally closed, in an exemplary embodiment, but then can be opened and/or closed, so as allow gas to move into the reaction chamber 122, in one exemplary embodiment. For reference, see, e.g., Clark Cooper valve model EH40-04A120-HY. Commercially-available valves can typically open and close in 50 to 100 milliseconds (0.050-0.1 seconds). According to yet another aspect of the present disclosure, it should also be noted that the exemplary gas supply manifold can include a small gas mixing and pressurization container or tank 313 whose known volume can enable these small quantities of gas to be determined through pressure, temperature and volume calculations before the gas can be transferred into the reaction chamber 122, in an exemplary embodiment. The manifold can also contain purge ports 316, which can be used to evacuate gases manually from its components as needed.

Figure 3C:
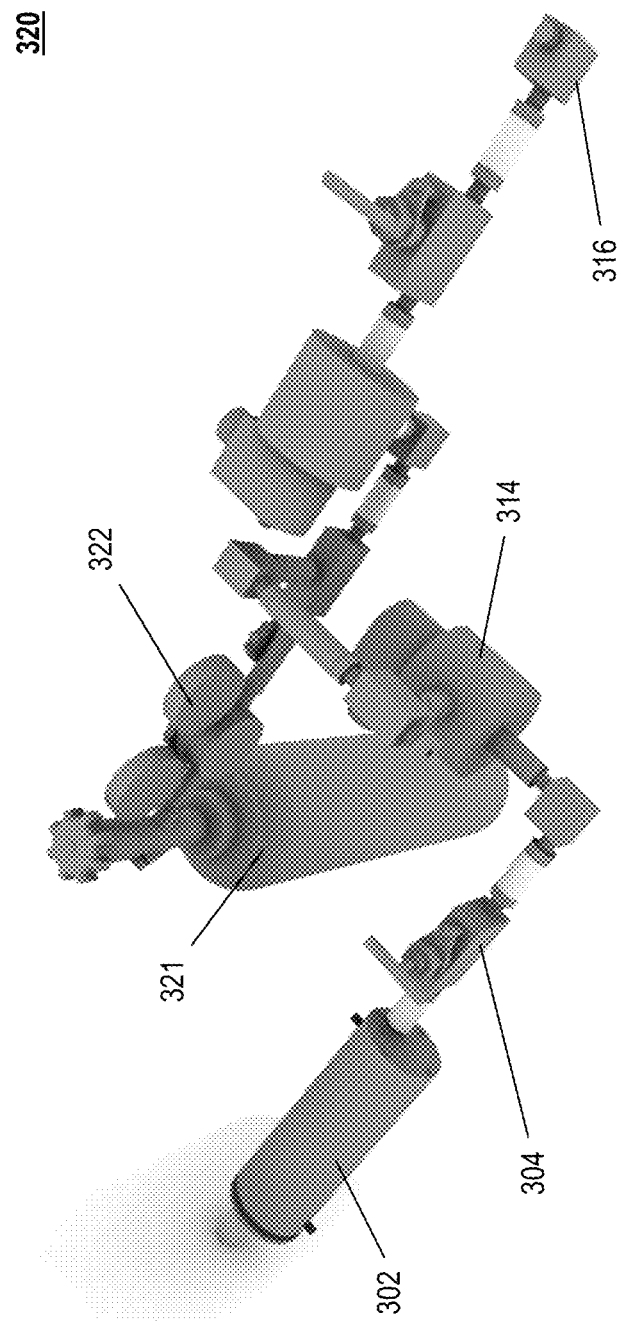

FIG. 3C depicts an exemplary perspective view of a carrier gas supply manifold 320, according to an exemplary embodiment. Depicted is an exemplary carrier gas supply manifold, including exemplary cooling chamber 302, exemplary mechanical valves 304, exemplary carrier gas canister 321, exemplary gas regulator 322, exemplary electric valve (s) 314, and/or exemplary purge port 316, in one embodiment. The carrier gas supply manifold 320 can control carrier gas emitted into the exemplary reaction chamber 122 of FIG. 2A during start-up and maintenance periods, in an exemplary embodiment. Similar to and as for the hydrogen/deuterium gas supply manifold 310, the carrier gas supply manifold 320 can also be designed to contain a low gas volume and to provide very small quantities of carrier gas (preferably argon) to the reaction chamber, in an exemplary embodiment. The valves of carrier gas operate in short, incremental steps with carrier gas valves normally closed but opened and closed to move carrier gas into the reaction chamber 122, according to an exemplary embodiment. The carrier gas supply manifold 320 can contain purge ports used to evacuate gases from their components, in an exemplary embodiment. The example hydrogen/deuterium gas supply manifold 310 of FIG. 3B and carrier gas supply manifold 320 of FIG. 3C, can be built, according to one embodiment, to be sufficiently rugged to contain the high pressure gases, and, for example, can be preferably constructed with high pressure, seamless ¼ inch, stainless steel tubing, or the like. The inner diameter of the exemplary tubing can be approximately ⅛ inch in an embodiment.

Figure 3D:
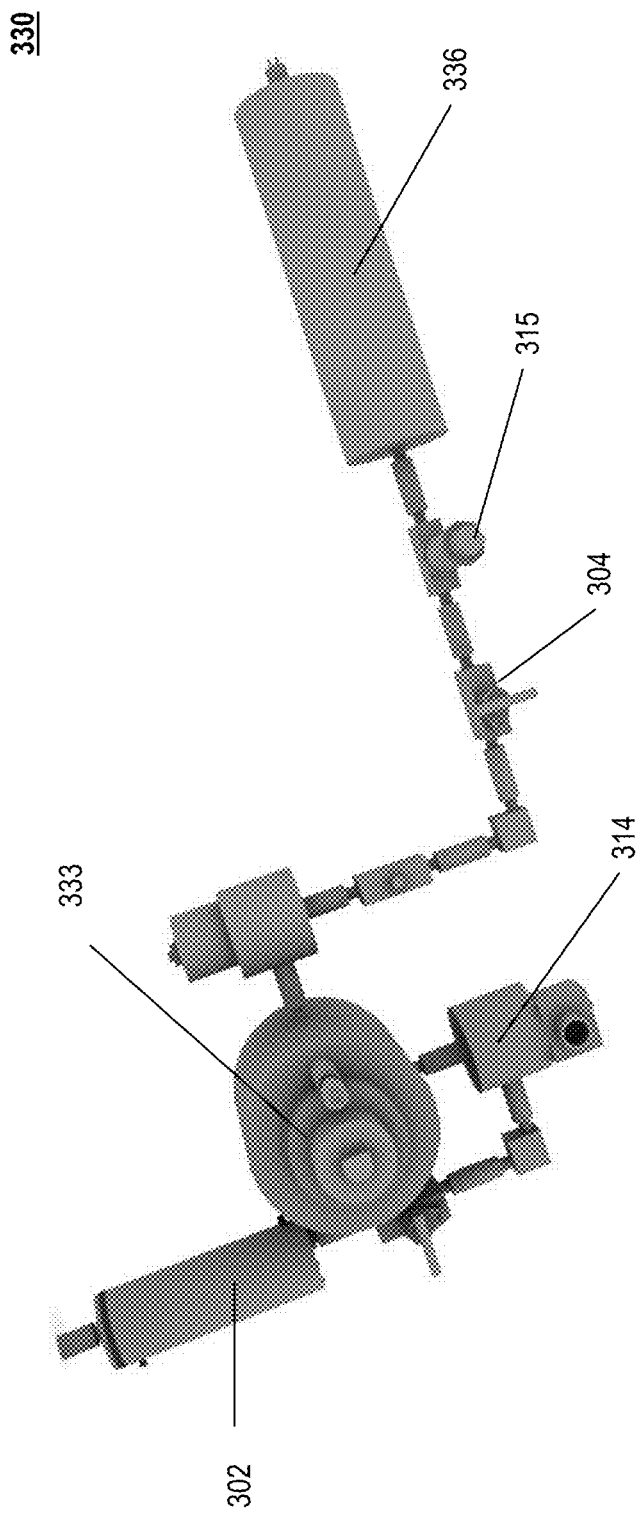

FIG. 3D depicts an exemplary top perspective view of an exemplary reaction gas product collection manifold 330, according to an exemplary embodiment. Depicted is an exemplary reaction gas product collection manifold 330, including, e.g., but not limited to, an exemplary cooling chamber 302, exemplary mechanical valve(s) 304, exemplary electric valve(s) 314, an exemplary separator valve with an electronic interface for matter output (EIMO) 333, exemplary pressure sensor 315, and exemplary reaction gas collection tank/bottle with thermal sensor 336, according to one exemplary embodiment. In a preferred embodiment, the exemplary electronic interface or EIMO 333 can include an acoustic or other type of electronic interface, a gas detector, and/or a reaction product sensor. In an exemplary embodiment, the electronic interface or EIMO 333 can be configured to manage material output through the separator valve and facilitate estimation of quantities of reaction gas being collected. The reaction gas product collection manifold 330, in an exemplary embodiment, can also enable reactant gas to be temporarily stored in a separate collection tank/bottle (not shown). Advantageously, the manifold 330, in an exemplary embodiment, can contain a purge port 316 (not labeled), which can be used for this purpose. The reactant gas or reaction gases are made to flow from the collection tank 336 through the purge port and into the separate collection tank by pressure differences between the two collection tanks. Evaluation of reactant gas collected through the purge port can be performed off-line with a commercial binary gas analyzer (for reference, see, e.g., Stanford Research Systems model BGA244), whose data can also be used to verify EIMO gas measurements. Quantities of gases to be extracted also can be determined through pressure, temperature and volume calculations for gas in the collection bottle. As for the gas supply manifolds, the reaction gas product manifold 330 is designed for safety to withstand high pressure and to contain a low gas volume, in an exemplary embodiment. The reaction gas product manifold, in an exemplary embodiment, can be designed and engineered, however, to operate only when reaction gas needs to be collected, whereupon manifold valves 314 can be operated to move gas product into the collection tank/bottle, in an exemplary embodiment. The valves can be closed during other periods of operation, such as during start-up and maintenance periods, in an exemplary embodiment. The reaction gas product collection manifold may be preferably constructed with exemplary high pressure ¼ inch stainless steel pipe with ¼ inch inner diameter, in an embodiment.

Figure 3E:
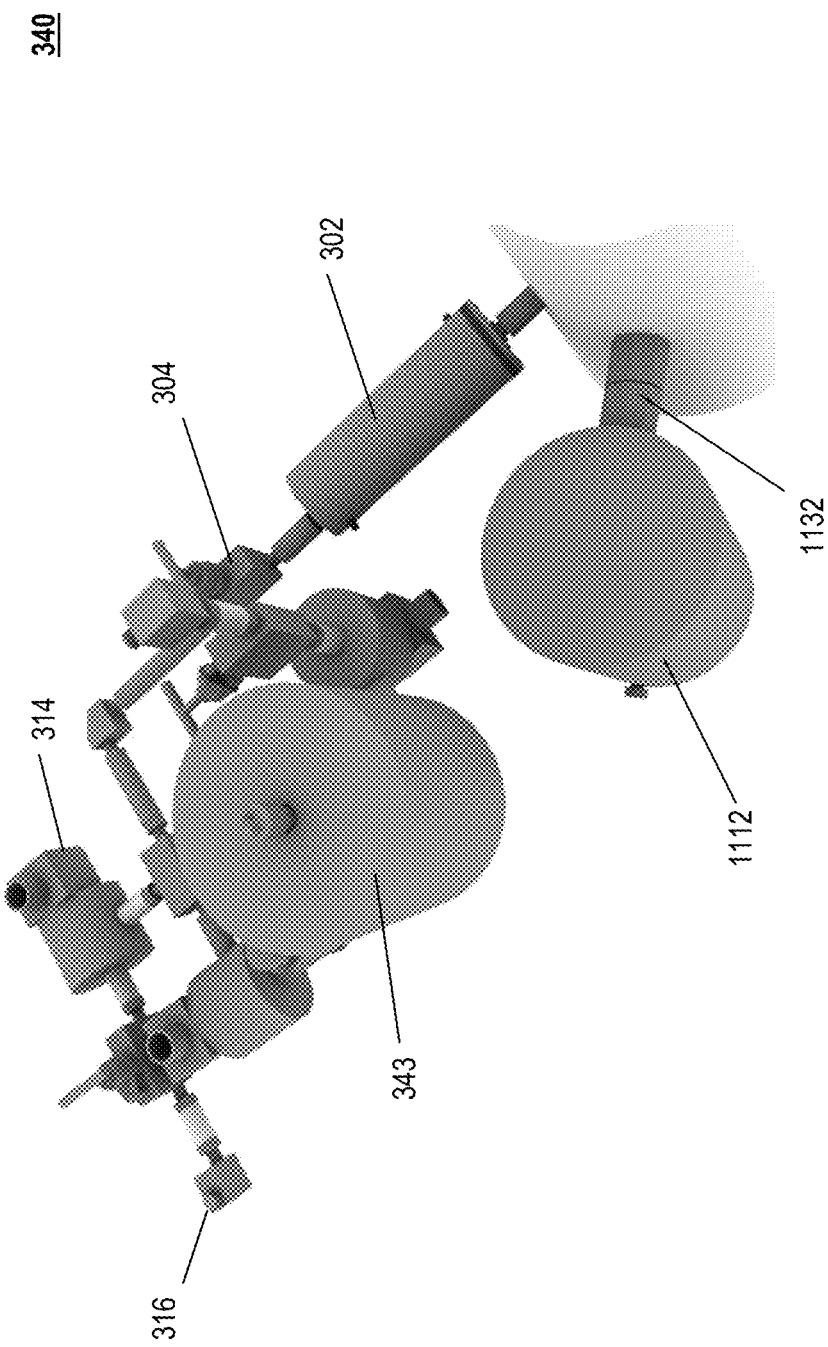

FIG. 3E depicts an exemplary top perspective view of an exemplary gas measurement and evacuation manifold 340, according to an exemplary embodiment. Depicted is an exemplary gas measurement and evacuation manifold 340, including, e.g., but not limited to, exemplary cooling chamber 302, exemplary mechanical valve(s) 304, exemplary electric valve(s) 314, exemplary measurement tank with thermal sensor 343, and exemplary pressure sensor(s) (not labeled) in one embodiment. Also, as an enhanced safety measure, an exemplary separate safety tank/bottle 1112 can be provided for transfer through an exemplary safety valve rupture disc 1132 of gas from the exemplary reaction chamber 122 of FIGS. 1A and 2A, if high pressure limits are exceeded, in an exemplary embodiment. The gas measurement and evacuation manifold 340 can enable the apparatus, including the reaction chamber 122 and key portions of other manifolds, to be evacuated during maintenance periods, in an exemplary embodiment. Advantageously, the manifold 340 can contain an exemplary purge port(s) 316 for this purpose, in one exemplary embodiment. According to another aspect of the present disclosure, the measurement tank or bottle 343 has a known volume to enable quantities of extracted gas to be determined through pressure, temperature and volume calculations before the gas is evacuated from the system. The exemplary reaction gas measurement and evacuation manifold 340 is designed to withstand high pressure and to contain a low gas volume, in an exemplary embodiment. The manifold 340 can also be designed to withstand high vacuums impressed on the system during maintenance periods. The manifold 340 can be constructed with high pressure ¼ inch stainless steel pipe with ¼ inch inner diameter, in an exemplary embodiment.

Figure 4A:
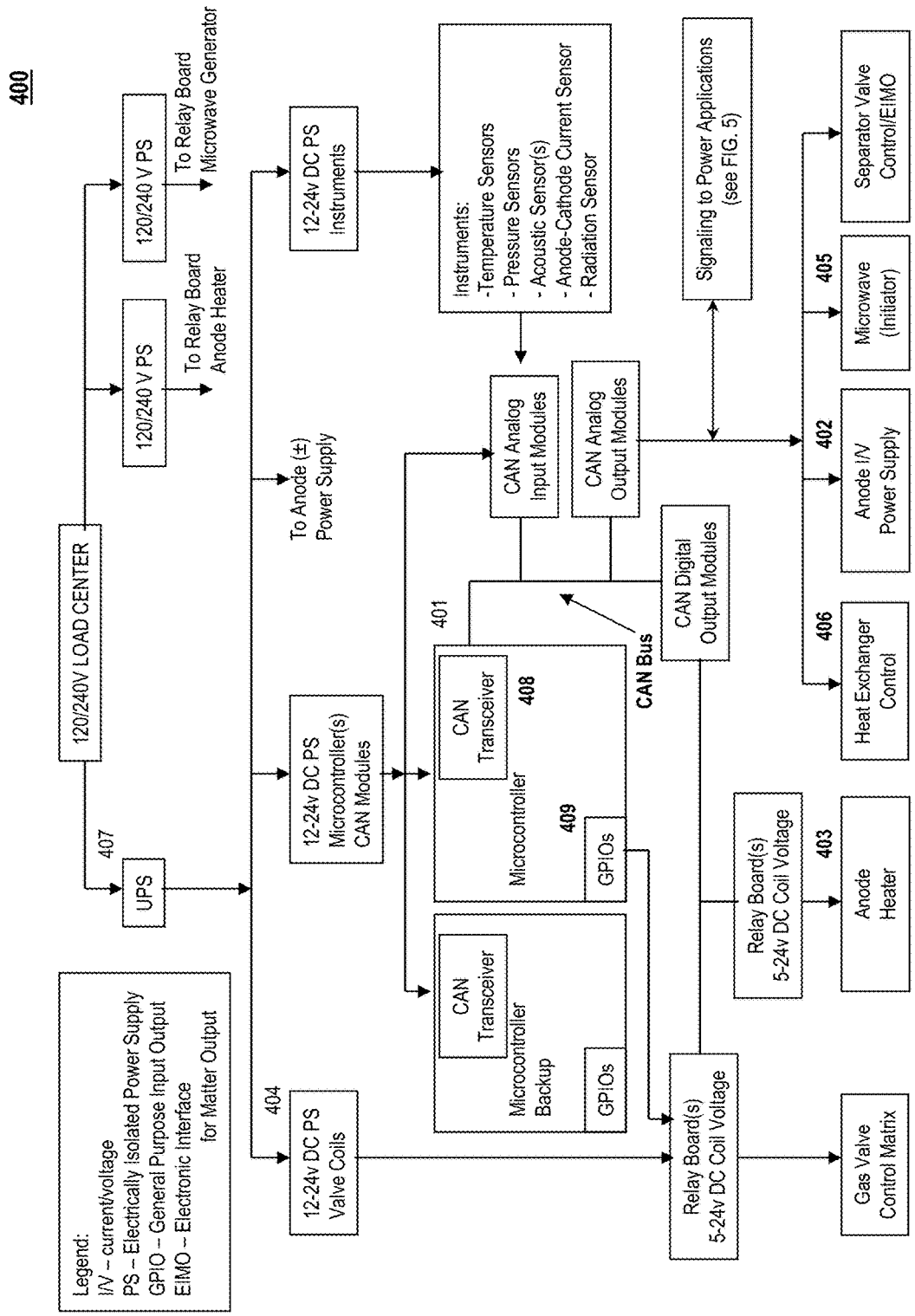
FIGS. 4A-B collectively form an exemplary embodiment of detailed schematic diagrams of the exemplary improved electronic control circuit according to an embodiment of the present disclosure.
Figure 4B:
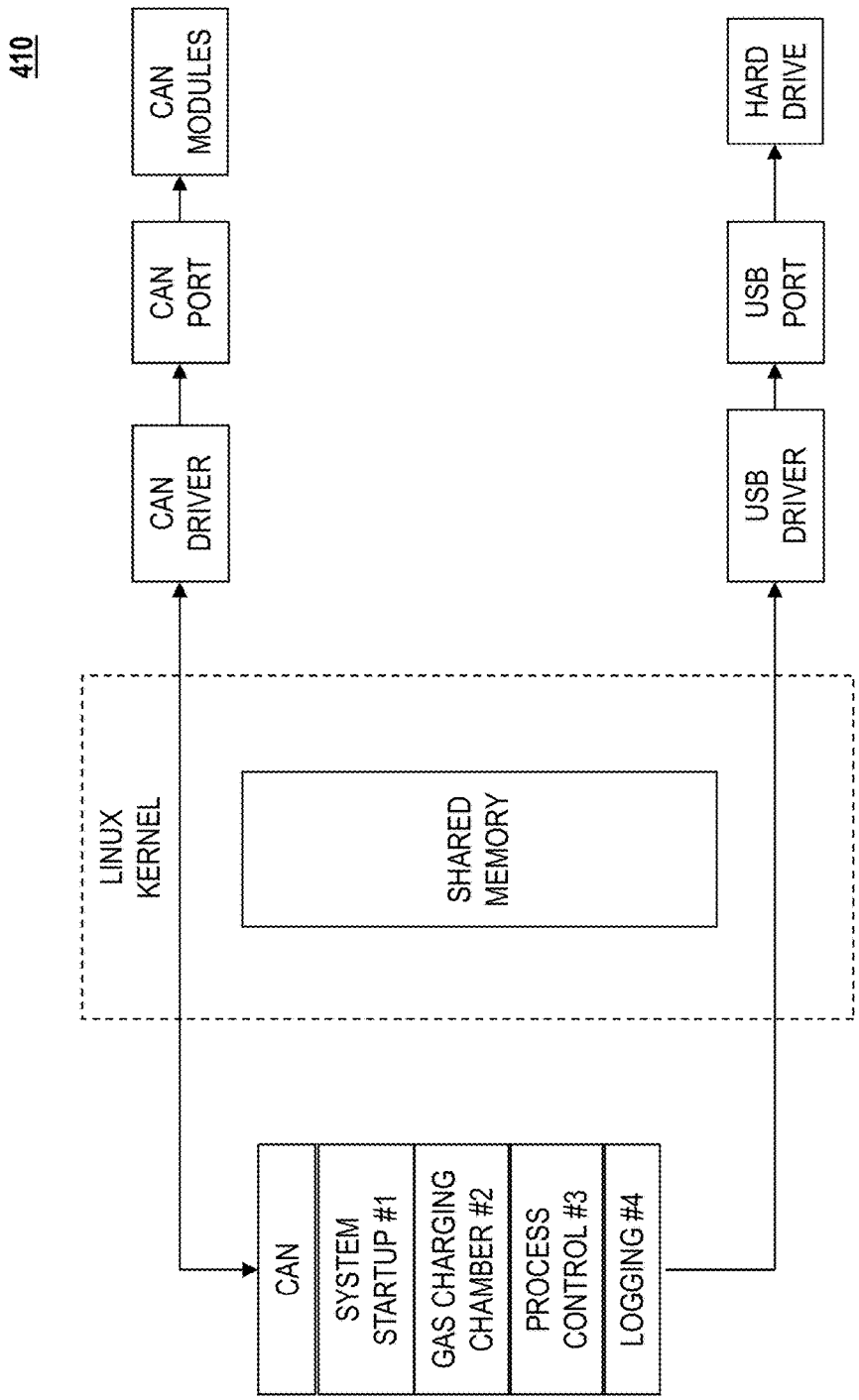

Referring now to FIGS. 4A-B, the preferred embodiment of the modular electronic control circuit (ECC) or subsystem 400 can include robust off-the-shelf electronic and electrical components, to include a special-purpose computer and/or monitor, microprocessor or microcontroller 401 with control software, long-term data storage unit(s), anode-to-cathode voltage/current supply 402, anode heater supply 403, gas valve power supply(ies) 404, nuclear radiation sensor electronics, starter/initiator/microwave electronics 405, heat exchanger electronics 406 and uninterruptible power supply (UPS) 407. The ECC can communicate with a wide number of electronic components, and can include temperature and pressure sensors for calculation of gas quantities to inject into the reaction chamber, according to an exemplary embodiment. The basic functionality of the modular ECC was described earlier in U.S. Pat. No. 6,248, 221 B 1, the content of which is incorporated herein by reference in its entirety, and will not be repeated here.

According to an exemplary embodiment, the ECC's exemplary hardware components can include a single-board computer containing a processor chip with accessory and supporting circuitry and relay boards. In an exemplary embodiment, the ECC can include, e.g., but not be limited to, a controller area network (CAN) transceiver chip and port 408; a universal serial bus (USB) port; an RS 232 serial port; general-purpose input and output(s) (GPIO) 409; an ethernet physical (PHY) interface and port connector; a VGA output display port (or SVGA, XGA, or HDMI) and connector; an external memory; an analog input extender board; an analog output extender board; and/or control area network containing digital output modules, digital input modules, analog output modules, analog input modules; a power supply; a process power supply; a bipolar (±), variable, high voltage and current power supply 402; an isolated power supply; equipment power supplies; a 12 volt DC power supply; an isolated 12 volt DC power supply; a 24 volt DC power supply, an isolated 24 volt DC power supply; a video screen; a display screen; an output device; an input device; a keyboard; a touch display; or a relay board.

According to other exemplary embodiments, various other input devices, output devices, sensor(s), accelerometer(s), pressure sensor(s), touchscreens, communication network subsystems, wireless communication, and other components can be integrated into the system.

According to an exemplary embodiment, the ECC's exemplary software components for process control and optimization can include, e.g., but not be limited to: a multiple-input and multiple-output (MIMO) control process; a MIMO control algorithm; a proportional-integral-derivative (PID) control algorithm; a feedback controller; a Pulsed Chamber Pressurizer algorithm; a least means square (LMS) algorithm for optimization; a Gradient Search by Steepest Descent algorithm; Box-Jenkins algorithm to "system ID" linear portions of the process; a Hammerstein-Wiener System estimator to "system ID" nonlinear portions of the process; a Radial Basis Network for system modeling to "system ID" linear and/or nonlinear portions of the process; a Principal Component Analysis (PCA) system to facilitate the system modeling process; and/or an Embedded Linux or other Operating System upon which the aforesaid process control and optimization software can execute.

According to an exemplary embodiment, the Pulsed Chamber Pressurizer can include, e.g., but not be limited to, a software algorithm that can control input gas valves such that a gas chamber is methodically charged with a proportion of gas(es) to a specified setpoint(s), e.g., even if the differential pressure from the input gas supply line(s) to the reaction chamber is much greater than the reaction chamber pressure. "Charge" (in the context of gases), in an exemplary embodiment, is the accomplishing of the correct pressurization and proportion of gases while compensating for temperature change during pressurization. Alternative embodiments can be constructed from hardware using, e.g., but not limited to, a field programmable gate array (FPGA), an application specific integrated circuit (ASIC), and/or other technology. For clarification, correct pressurization is a subset of charging. "System ID" means to model, discover and identify system process characteristics under a broad range of input conditions and to create a mathematic model that accurately describes the same characteristics, where the same model can be implemented into control system software in the form of parameterization, in an exemplary embodiment.

FIG. 4A depicts an exemplary circuit architecture 400 for the ECC, according to one exemplary embodiment. One unique aspect, in one exemplary embodiment of the ECC can include, e.g., but not be limited to, real-time control of the reaction process through combined independent and interdependent application of control elements (processor outputs) indicated above: the voltage/current source between the anode and cathode (represented by 402) providing a potential difference between the anode and cathode; the anode heater 403; the heat exchanger (represented by 406); and the microwave source 405, all of which facilitate additional transport of gas between the anode and cathode and each supporting diffusion of gas into the reaction material, in one exemplary embodiment. For clarification, the exemplary process, in one exemplary embodiment, may be enabled through an exemplary single control element, multiple elements or through a combination of all elements acting synergistically.

According to another important aspect of the present disclosure, the exemplary ECC can, e.g., but not be limited to, provide, monitor, analyze and otherwise control the necessary and desired sequence of operational steps during set-up and initial steps of reactor operation, in one exemplary embodiment. (See exemplary numbered items in the process and software architecture depicted in FIG. 4B). Advantageously, in an exemplary embodiment, the possible amount of energy that can be produced through chemical reactions in the initial exemplary feature steps (#1) of reactor operation can be mathematically determined from known quantities and physical characteristics (e.g., mass and volume) of the reactor and cathode material, as well as included oxygen and hydrogen, for example. This excess amount of chemical energy produced during the initial steps of reactor operation, as determined by real-time pressure and temperature measurements, can then be compared against the expected energy (i.e., chemical and nuclear), in an exemplary embodiment. In an exemplary embodiment, additional sequences of carrier gas/vacuum purging steps can be performed as needed to limit the amount of aforesaid chemical energy produced.

According to another important aspect of the present disclosure, during both exemplary initial and exemplary continuous steps of exemplary reactor operation (#2/3), the ECC can provide exemplary precise control of gas pressure and proportion of the mixture of gases in the reactor, in one exemplary embodiment. This can be accomplished with the exemplary Pulsed Chamber Pressurizer algorithm applied to charging the mixing chamber and to charging the reaction chamber, in one exemplary embodiment. Due to the high amount of pressure in the gas supply and relatively low pressure and quantity of gas for the mixing chamber and reaction chamber, conventional control of gas flow is not sufficient for optimum chamber pressure and mixture precision. The gas valves can, therefore, be pulsed open for time intervals less than or equal to the valve's maximum open and close time, whereby the amount of gas in each pulse is small relative to the amount of gas required in the chamber, and the amount of gas flow is determined by the number of pulses, in one embodiment. The amount of each type of gas and the corresponding number of pulses required can be calculated algorithmically according to measured inputs, including, in one exemplary embodiment, supply tank pressure, reaction chamber volume, pressure and temperature, mixing chamber volume, pressure and temperature, and the user-determined chamber pressure and temperature setpoints, in one embodiment. In an exemplary embodiment, volumes to be loaded with deuterium and/or hydrogen gas (reference "A Theoretical Model for Low-Energy Nuclear Reactions in a Solid Matrix" by K. P. Sinha, 1999) can include the annular space around the anode and within the cathode material for which the ECC can calculate and limit loading objectively to less than a maximum allowed quantity of gas for each unit volume of reaction material (e.g., million atoms).

According to another important aspect of the disclosure, the microwave source can operate by irradiating the reaction volume (cavity) with electromagnetic radiation by methods known to those skilled in the art of microwave plasma generators, in one exemplary embodiment. See, for example, "The Large Volume Microwave Plasma Generator: A New Tool for Research and Industrial Processing," by R. G. Bosisio et al. and "Microwave Discharges: Generation and Diagnostics," by Yu. A. Lebedev. In an exemplary embodiment, the antenna for the microwave source causes the cavity between the anode and cathode to operate at a commonly used microwave frequency, e.g., 2.45 GHz, to create polarized movement of the deuterium, hydrogen and argon carrier gas mixture, thereby increasing the electron-gas molecule collision frequency. According to an aspect of the disclosure, the improved ECC can include a robust loop or other microwave antenna that, instead of being exposed, advantageously can be encased in a ceramic tube to provide mechanical stability and otherwise protect the antenna, in one exemplary embodiment. According to another aspect of the present disclosure, the coax cable for the antenna can be connected or coupled to the antenna, and the antenna and the ceramic tube can be made as an integrated component for ease of repair or replacement during maintenance, in one exemplary embodiment.

Another unique aspect of the exemplary ECC is the example capability of continuous data collection and logging (#4), in one exemplary embodiment. Data logging can provide continuous sampling of system sensors at an example constant sampling rate, as determined by engineering and scientific personnel prior to and/or during system operation. Data logging can be automatic and processor-based, in one exemplary embodiment. In one exemplary embodiment, system software can detect a single sensory event or any multiple combinations of sensor events occurring within the logged data or in real time. System control parameters can be determined empirically from a computer analysis of the logged data and from knowledge of significant system events extracted therefrom and enabled by System ID, in one exemplary embodiment. The information contained in the same logged events can be used to improve and optimize reactor operation through adjustment of control parameters and internal algorithm parameters as well as thresholds for fail-safe operation enabled by adaptive processes, in one exemplary embodiment. This capability can also recognize patterns amongst the sensory inputs that can indicate any of a number of system conditions, including hazard to persons or equipment, and can control system component failure whether partial, intermittent or full and system operational inefficiencies, in one exemplary embodiment.

Exemplary Electronic Control Circuit Tasks/Functions in an exemplary embodiment include:

1. Provide automated system pre-startup sequence;
2. Provide automated charging of mixing chamber and reaction chamber;
3. Control reaction chamber dynamics during startup and/or operation;
4. Provide automatic fail-safe shut down procedures;
5. Provide long term application and/or automatic adjustment of control system output signals to the process to facilitate the empirical discovery of the signal levels required to initiate, control and/or maintain a desired reaction and to otherwise enable controllability and repeatability;
6. Provide process measurements for real-time human operator observation;
7. Enable human interface with the process through video screens where an operator or engineer can initiate and/or terminate a process, and/or adjust specified control system parameters to change the speed, nature and intensity of a process;
8. Provide detection of significant system events and/or combinations thereof, measured from sensory input field devices, and/or further provide a corresponding threshold table upon which the control system automatically responds;
9. Provide a collection of data from one or more, or all sensory input devices sampled and stored in an exemplary static, external device connected or coupled through, e.g., the processor board USB port;
10. Provide adaptive algorithms for system self adjustment and/or system identification algorithms for modeling of system characteristics; and/or
11. Measure the excess heat as a function of time.

In one embodiment, the input valve(s) can be pulsed such that no temperature-compensated pressure setpoint is overshot by more than a specified value (e.g., 5 psi) and such that the specified charging process completes in less than a time setpoint where pressure(s) are within a differential psi of the temperature-compensated setpoint(s) according to one exemplary embodiment. Selection of gas(es), the proportion thereof, and pressurization setpoint(s) are engineer specified, in one embodiment. Furthermore, the charge speed versus overshoot risk can be operator controlled through the use of engineer accessible control parameters, in one embodiment. A threshold table can be built in software containing a list of actions, some initiated by interrupt, corresponding to a list of events characterized by sensory device input, or combinations thereof, where the system fails to maintain or timely achieve thresholds, in one embodiment.

According to an exemplary embodiment, an electronic control system can include a processor (e.g., FPGA, PLC, embedded CPU, ARM-based controller, microcontroller, ASIC, etc.), wherein the reaction contained in the reaction chamber can be controlled by a computer implemented control algorithm and control algorithm parameters are determined adaptively through an iterative or empirical process. According to an exemplary embodiment, the activity in the reaction chamber can have some nonlinearity, thus, an embodiment can include a learning algorithm configured to optimally adjust parameters. The system can be adaptive, in an exemplary embodiment. The system can use feedback control and be adaptive. It can also, for example, be connected with, or coupled to, and provide signaling to mechanical steam controllers and pressure valves for different possible power applications, see, e.g., but not limited to, FIG. 5.

Assembly and Operation

These details can enable one skilled in the art to assemble the apparatus' custom-designed and off-the-shelf parts without an undue amount of additional research into system design. Many technology companies already have much of the needed electronic equipment. The manufacturer of consolidated cathode reaction material, as example, may use the apparatus to quantify the ability of manufactured cathodes to absorb deuterium or hydrogen gas. The system would enable the reaction material initially to be subjected to high vacuum and subsequently to measured quantities of one gas or both. Temperature and pressure measurements recorded during steps of the process can be used to quantify amounts of gas able to be absorbed, and these data then used to improve on reaction material design and for quality control of the cathode manufacturing process. The operator may use the apparatus to investigate the possible amount of energy produced through chemical reactions. The nuclear scientist investigating types of reactions in the cathode may use the apparatus to quantify the amounts of reaction products produced. The system would enable small samples of reaction product gases to be extracted from the reaction gas product manifold and subjected to further measurements and study. The space power engineer may use the apparatus to quantify any amount of thrust that could be provided from the heat exchanger.

Assembly.

A new cathode is inserted into the reaction chamber and a new heater is inserted into the anode. The header is mated to internal support insulators and connections are made to header feedthroughs from the anode, anode heater, microwave antenna and thermocouple temperature sensor. The completed header assembly is lowered into the reactor and sealed with metallic seals. The reaction chamber is fitted into the heat exchanger and sealed. The four gas manifolds are mated with the reaction chamber. Electrical connections are made with the header feedthroughs and manifold temperature and pressure sensors and valves. After mechanical and electrical assembly, the system's software is loaded into its computer or microprocessor and exercised to demonstrate that all operations are appropriately controlled. The computer/data acquisition system would be set to continuously (e.g., each second) record data from all voltage and current sources, temperature and pressure sensors, and valve settings.

Preparation for Operation.

The sequence of operations would begin with all valves closed. The system is pressurized and valves cycled to ensure that leaks do not occur from the reaction chamber, header and manifolds. The reactor would then be subjected to a sequence of vacuum and high temperature cycles. Carrier gas would be provided to help remove oxygen. The system under vacuum is allowed to bake until no further pressure changes occur. At this time, the cathode is assumed to be depleted of absorbed gases. Vacuum pumping is valved off. The natural pressure rise in the system is documented versus time.

Fueling and Loading.

The sequence of operations from this point would vary according to operational objectives. In general, a small increment of deuterium would be provided first to the reaction chamber before any hydrogen. Pressure inside the reaction chamber would be monitored to determine loading of the cathode with gas; and, loading steps would be repeated as needed. After sufficient loading, the reaction chamber would be subjected to high temperature from the anode, and to high voltage potential on the anode. The heat exchanger would be cycled briefly to cool the outer surface of the reaction chamber. These loading steps would be repeated as additional deuterium and/or hydrogen is loaded into the cathode. Data recorded by the computer would be used to determine the efficiency with which the cathode is loaded and the amount of any energy produced.

Operation and Mature Operation.

The fueled reaction chamber is now ready for operation. The heat exchanger and other elements of the cooling system, anode heater and anode voltage are engaged. The cathode remains at ground potential. The reaction chamber pressure and temperature are monitored to ensure that operating limits are not exceeded. Loading steps would be repeated as additional deuterium and/or hydrogen is required to be loaded into the cathode. Microwave excitation can be applied to improve ionization and potentially excite the cathode lattice structures. Data recorded by the computer is used to determine the efficiency with which the cathode is loaded and the amount of energy produced during operation. Electronic computer control operates the system according to planned set points. After some period of operation, temperature in the reaction chamber can be expected to decrease as gas is consumed and reaction products increase. Computer control can reestablish the operating point by quickly pulsing the gas valves to admit the necessary quantity of deuterium/hydrogen. Reaction gas product is removed after a sufficiently long period of operation by operating valves in the collection gas manifold. The exhaust gas can then be further processed as desired.

Quenching and Shutdown.

Input energy (anode heat, anode-to-cathode current and microwave excitation) is terminated when it is desired to stop the reactor. The reactor will relax to an energy neutral state and the cooling system is used to reduce the temperature to ambient. Inert carrier gas can be injected to quench the system. When this is complete, the vacuum system can be used to empty the reactor in preparation for maintenance or the next operational cycle.

If demonstrated to produce energy efficiently, the present disclosure has potential application in many situations that require a long-term, continuous source of heat energy with minimal environmental and safety concerns, inexpensive and small-volume fuel requirements, and simplified operational procedures with little necessary monitoring. In many possible applications greatly reduced initial capital costs can be expected. Following are a few exemplary, but non-limiting examples of its potential applications:

Primary use can include replacement for existing heat sources in conventional and nuclear power plants. Example advantages can include lack of fossil fuel emissions and fossil fuel requirements. In nuclear systems, example advantages can include lack of radioactive waste, minimal shielding requirements and standoff distances, and elimination of large onsite inventory of high-level radioactive materials (i.e., avoidance or elimination of meltdown risk of Fukushima, Chernobyl, Three Mile Island and other potentials). Arrays of supplemental thermoelectric generator elements can be used to create energy from heat. Further the heat source can be used for desalinization of water, in exemplary embodiments.

Potential use can include distributed power production systems. Localized (such as, e.g., but not limited to, city, neighborhood, individual building) power plants can use these embodiments. Example advantages over traditional centralized generation and distribution can include, but are not limited to, cost savings from lack of high maintenance distribution networks, improved efficiency from lack of transmission losses, and reduced susceptibility to mass failures (from, e.g., but not limited to, natural disasters, war, terrorism, electromagnetic pulse (EMP) disturbance, coronal mass ejection (CME), etc.).

Many nations maintain outposts and research facilities in polar and/or other remote and/or other power accessibility poor regions. These embodiments can potentially support these needs and greatly reduce associated environmental concerns. By comparison, conventional nuclear sources are environmentally unpalatable and conventional fossil fuel systems can have enormous logistical problems in these application.

Deep space operations have a critical need for long-lived power sources, as may be provided by embodiments in this disclosure. Sufficient conventional fuels cannot be conventionally carried along. Solar power becomes less useful as the distance from the sun increases. A nuclear isotope thermoelectric generator (i.e., a current solution) can be expensive and can present unusual risks in launch. The embodiment in this disclosure can require minimal and lightweight fuel requirements and potentially replace isotope cores in thermoelectric generator systems.

The system in this disclosure can potentially be used in modular designs where some modular systems are impractical. Accordingly, the exemplary system can include the use of multiple, identical and aggregated and/or coordinated systems, plus there can be an environmental benefit. An exemplary embodiment can support distributed energy systems and can support an exemplary neighborhood system, which by its close locality, can avoid transmission losses.

A system derived from this disclosure can potentially be very useful in desalinization and/or other water producing facilities worldwide as a primary heat source, or for providing electricity. Such facilities will likely be in high demand based on current population projections.

It is possible that the system can be adapted to meet propulsion requirements for both land-based and seagoing transport vehicles and become an alternative to conventional nuclear technology in subsurface vehicles.

Industrial operations, such as chemical processing, synthesizing, and refining, along with many manufacturing facilities, have requirements for sources of heat that do not have the safety concerns of conventional burning of fossil fuel. Similar considerations exist in facets of mining industries. Systems derived from this disclosure could reduce fire and explosion hazards and minimize contamination, unlike conventional sources.

Smaller power sources can be very useful in regions of the world that have little or no modern infrastructure. According to other exemplary embodiments, multiple uses can range from small direct thermoelectric generators to sterilization facilities for rural or temporary clinics.

Various other possible applications of energy and heating can be used, as will be apparent to those skilled in the relevant art, according to an exemplary embodiment.

SUMMARY OF THE PREFERRED EXEMPLARY EMBODIMENTS

According to a preferred embodiment, the gaseous electrolysis apparatus comprises a cooled header with at least one electrical connector or coupling; a heat exchanger configured to remove heat from a surface of the reaction chamber; a gas handling system mechanically coupled to the reaction chamber; and, an electronic control circuit electrically connected to the header and gas handling system.

According to a preferred embodiment, the said header, as shown in FIGS. 1D and 6B, comprises a cooling apparatus; cooling manifold or water jacket and at least one feedthrough to a header cooling manifold proximate to said header.

According to a preferred embodiment, at least one feedthrough, as shown in FIGS. 1B-C and 6C, comprises a pressure side oriented towards the inside of the reaction chamber, is welded into a thermal plate or comprises a threaded coupling, and extends beyond the header for connection with the electronic control circuit.

According to a preferred embodiment, the header, as shown in FIGS. 1B-C and 2A, comprises an anode connection, anode heater wire connections, microwave antenna connection, thermal sensor connection, microwave loop antenna, and insulator(s) configured to electrically isolate, minimize the volume where gas resides, and provide mechanical support for components within the reaction chamber.

According to a preferred embodiment, the gaseous electrolysis apparatus further comprises a modular, removable anode, as shown in FIGS. 2A-B and 6D. The edges of the anode facing the cathode are tapered or curved to help prevent high voltage breakdown between the anode and cathode.

According to a preferred embodiment, the gaseous electrolysis apparatus further comprises a modular, removable, hollow-shaped, cylindrical cathode, as shown in FIGS. 2A-B and 6E, with a central cavity configured to receive the anode, encased by an outer metal supporting sleeve, and bounded at its base and top with insulator endcaps. The cathode is co-disposed about the anode within the reaction chamber and the cathode and anode are coaxial. The edges of the reaction material part facing the anode are tapered or curved to help prevent high voltage breakdown between the anode and cathode.

Figure 2C:
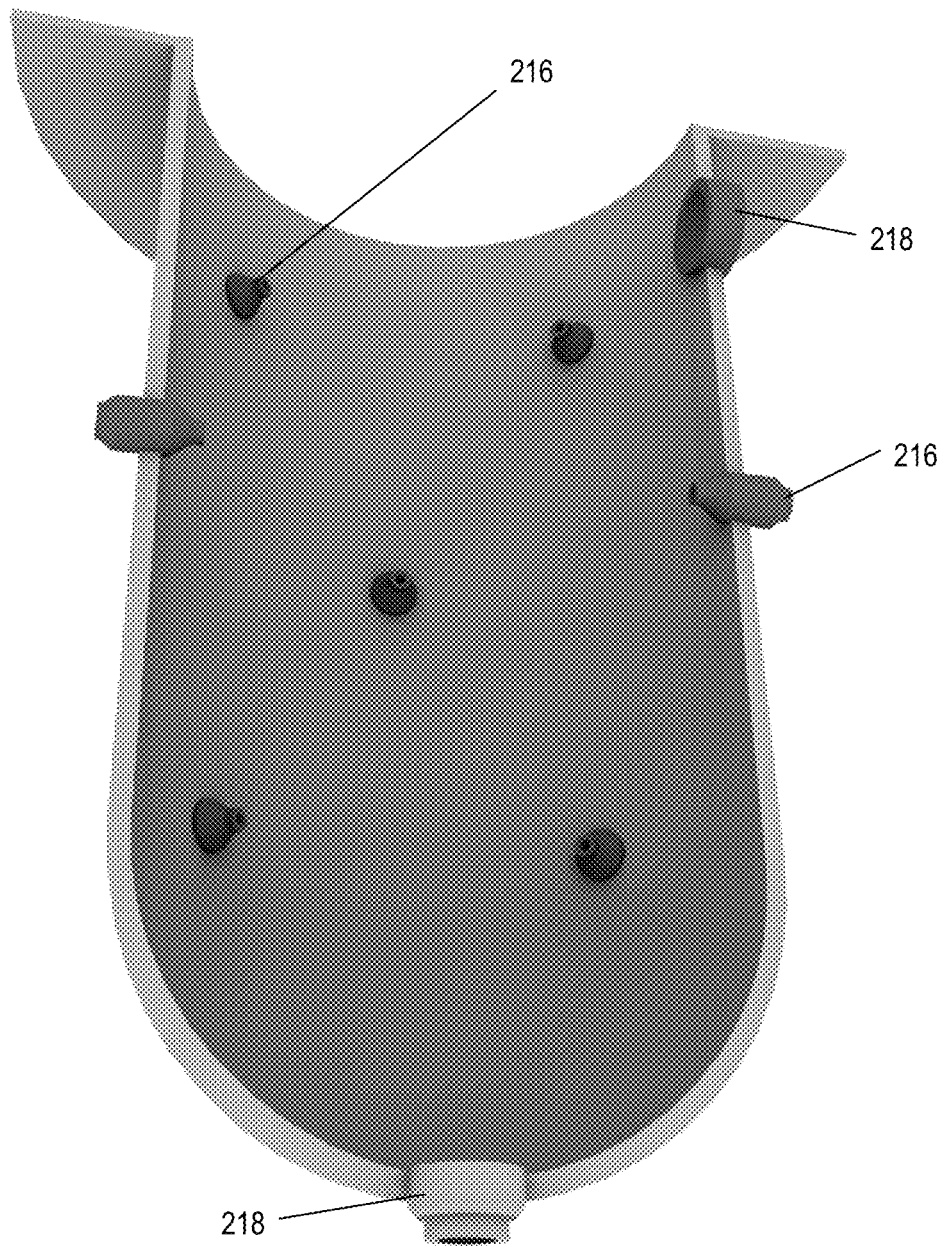

According to a preferred embodiment, the heat exchanger, as shown in FIG. 2C, is modular and comprises a relatively low volume flash boiler engineered to provide a mist of water or other coolant to the outer surface of the reaction chamber, a plurality of spray nozzles to cool at least one portion of the reaction chamber, at least one steam pressure port, and at least one thruster port configured to provide pressure output. The heat exchanger is co-disposed around the reaction chamber.

According to a preferred embodiment, the gas handling system, as shown in FIGS. 3A-E, comprises four separate gas manifolds that can control gas flow while minimizing gas volume external to the reaction chamber: a hydrogen/deuterium gas supply manifold; an inert carrier gas manifold; a reaction gas product collection manifold; and a gas measurement and evacuation manifold.

According to a preferred embodiment, the gas manifolds, as shown in FIGS. 3A-E, comprise a cooling chamber or water jacket to provide cooling for gas tubing and pipes connected or coupled to the reaction chamber, gas compatible valves, pressure and temperature sensors connected to the electronic control circuit/subsystem, tanks or containers whose known volume enables small quantities of gas to be determined by calculating pressure, temperature and volume before gas is transferred into or out of the reaction chamber, and purge ports which can be used to evacuate gases manually.

According to a preferred embodiment, the reaction gas product collection manifold comprises a container configured to temporarily store reactant gas and periodically permit extraction from the container and an acoustic sensor subsystem or other type of electronic interface to facilitate estimation of reaction product gas quantity, as shown in FIGS. 3D and 6F.

Figure 5:
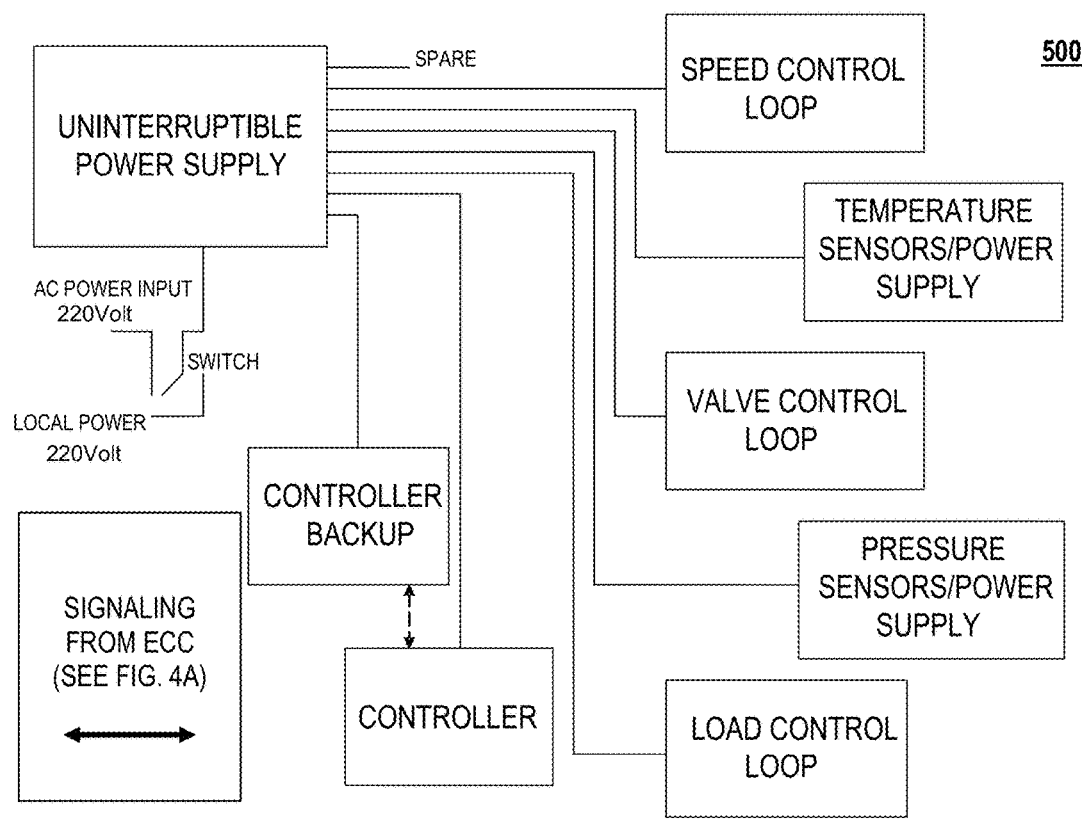
FIG. 5 depicts an example mechanical steam controller system connected or coupled to the exemplary improved electronic control circuit according to an embodiment of the present disclosure.

According to a preferred embodiment, the electronic control circuit (ECC), as shown in FIGS. 4-5, comprises off-the-shelf electronic and electrical components, to include a special-purposed computer and/or monitor, microprocessor or microcontroller with control software; long-term data storage unit(s); special-purposed anode-to-cathode voltage/current supply; anode heater supply; gas valve power supplies; nuclear radiation sensor electronics; microwave starter/initiator electronics; heat exchanger electronics; and uninterruptible power supply (UPS).

Other modifications and variations to the disclosure will be apparent to those skilled in the art from the foregoing disclosure and teachings. Thus, while only certain embodiments of the disclosure have been specifically described herein, it will be apparent that numerous modifications may be made thereto without departing from the spirit and scope of the disclosure.

Therefore, we claim:

1. A modular gaseous electrolysis apparatus, wherein an electrolyte is gas, the gaseous electrolysis apparatus comprising:
    an actively-cooled header module with at least one electrical connector or coupling, and
        wherein said actively-cooled header module is configured to be one of:
            opened/removed, and closed/installed;
a heat exchanger module configured to:
  remove heat from a surface of a reaction chamber module; and
  facilitate and control a thermal gradient through a removable cathode module, and a wall of the reaction chamber module, wherein said heat exchanger module is separate from the removable cathode module, and wherein the reaction chamber module is configured to receive the gas electrolyte;
wherein said heat exchanger module is capable of assembly, and disassembly, and
wherein the gaseous electrolysis apparatus comprises at least one or more of:
  wherein the gaseous electrolysis apparatus is configured to include hermetic seals to maintain integrity in an elevated pressure and temperature environment;
  a flash boiler is configured to provide a mist of water or other coolant to the outer surface of the reaction chamber module; or
  a plurality of spray nozzles is configured to cool at least one portion of the reaction chamber module and to facilitate and control thermal diffusion through the removable cathode module; and
at least one or more of:
  at least one steam pressure port; or
  at least one thruster port configured to provide pressure output;
a gas handling system, configured to provide the gas electrolyte, said gas handling system mechanically coupled to the reaction chamber module and separate from the reaction chamber module,
wherein said gas handling system comprises at least one or more of:
  a measurement container configured to temporarily store reactant gas and periodically permit extraction of the reactant gas from said measurement container; or
  a subsystem comprising an acoustic sensor or other type of electronic interface, configured to facilitate estimation of quantities of reactant gas;
an electronic control circuit module electrically coupled or connected to said actively-cooled header module and said gas handling system and configured to electronically control said gas handling system;
a modular, removable anode module comprising:
  an electric heater disposed within the modular, removable anode module;
wherein said actively-cooled header module, said heat exchanger module, the removable cathode module, said modular, removable anode module, said electric heater, said gas handling system, and said electronic control circuit module are removably and mechanically coupled to the reaction chamber module; and
wherein said gas handling system comprises:
  a gas manifold module that controls gas flow external to the reaction chamber module,
  wherein said gas manifold module comprises:
    a reaction gas product collection manifold module, mechanically coupled to said reaction chamber module, and coupled to a reaction gas product collector and further comprising:
    at least one mechanical valve;
    at least one electronically controlled valve;
    at least one separator valve with an electronic interface for matter output (EIMO);
    at least one pressure sensor;
    at least one exemplary reaction gas collection tank or bottle comprising a thermal sensor; and
  wherein said at least one electronic interface for matter output (EIMO) comprises at least one or more of:
    the at least one acoustic sensor or other type of electronic interface;
    at least one gas detector, or
    at least one reaction product sensor; and
  wherein said at least one electronic interface for matter output (EIMO) comprises being configured to at least one or more of:
    manage material output through said at least one separator valve; or
    facilitate estimation of quantities of reaction gas being collected.

2. The gaseous electrolysis apparatus according to claim 1, wherein said actively-cooled header module is configured to enable the gaseous electrolysis apparatus to be operated for a period of time between maintenance periods, and wherein said actively-cooled header module comprises at least one or more of:
  a physically extended cooling manifold or water jacket, to improve thermal efficiency; or
  at least one feedthrough to a header module cooling manifold proximate to said actively-cooled header module.

3. The gaseous electrolysis apparatus according to claim 2, comprising said at least one feedthrough configured and constructed with at least one conductor surrounded by at least one insulating material to maintain integrity of electronics fed therethrough during a period of at least one or more of: a variable duration, or a long duration, of elevated pressure and temperature environment, and
wherein said at least one feedthrough comprises at least one or more of:
  is welded into a thermal plate;
  wherein one end of said feedthrough extends beyond said actively-cooled header module for connection with the electronic control circuit module; or
  wherein said at least one feedthrough comprises a threaded coupling.

4. The gaseous electrolysis apparatus according to claim 1, wherein said actively-cooled header module comprises:
  a gasket to seal the actively-cooled header module to a top of a body of the reaction chamber module;
  at least one anode module connection;
  at least one anode module heater wire connection configured such that a heater is configured to raise a temperature of reaction material in the removable cathode module;
  at least one thermal sensor connection;
  at least one ceramic-encased microwave loop antenna configured to:
    facilitate transport of the gas electrolyte between an anode module and the removable cathode module; and
    support diffusion of the gas electrolyte into a reaction material; and
  at least one insulator configured to at least one or more of:
    electrically isolate;
    minimize a volume where the gas electrolyte resides; or
    provide mechanical support for components of the heater module within the reaction chamber module.

5. The gaseous electrolysis apparatus according to claim 1, wherein the
modular, removable anode module further comprises wherein edges at the ends of said modular, removable anode module facing the removable cathode module are tapered or curved to help prevent high voltage breakdown between the modular, removable anode module and the removable cathode module.

6. The gaseous electrolysis apparatus according to claim 1, wherein the removable cathode module comprises:
a modular, removable, hollow-shaped, cylindrical removable cathode module, electrically coupled, connected, or grounded to the reaction chamber module with a central cavity configured to receive an anode module;
wherein the removable cathode module is-encased by an outer metal supporting sleeve;
wherein the removable cathode module is bounded at a base and at a top of the removable cathode module with at least one insulator endcap; and
wherein edges at the ends of a reaction material part of the removable cathode module facing the anode module are at least one of tapered or curved to help prevent high voltage breakdown.

7. The gaseous electrolysis apparatus according to claim 1, wherein said heat exchanger module comprises at least a portion of a space surrounding the reaction chamber module, and
is co-disposed around the reaction chamber module.

8. The gaseous electrolysis apparatus according to claim 1, wherein said gas handling system comprises: four (4) separate gas manifold modules, coupled to said reaction chamber module, said four separate gas manifold modules are configured to control gas flow external to the reaction chamber module, while serving to minimize gas volume external to said reaction chamber module,
wherein said four separate gas manifold modules comprise:
a hydrogen/deuterium gas supply manifold module, mechanically coupled to said reaction chamber module, and coupled to a hydrogen/deuterium supply gas supply source;
an inert carrier gas manifold module, mechanically coupled to said reaction chamber module, and coupled to an inert gas supply source;
a reaction gas product collection manifold module, mechanically coupled to said reaction chamber module, and coupled to a reaction gas product collector; and
a gas measurement and evacuation manifold module, mechanically coupled to said reaction chamber module, and coupled to a gas measurement and evacuation device.

9. The gaseous electrolysis apparatus according to claim 8, wherein each of said four separate gas manifold modules, coupled to said reaction chamber module, comprises:
a cooling chamber or water jacket to provide cooling for gas tubing and pipes connected or coupled to the reaction chamber module;
at least one normally closed, gas compatible valve, at least one pressure sensor and at least one temperature sensor connected to, or coupled to said electronic control circuit module/subsystem; and
at least one tank or at least one container whose known volume enables small quantities of gas to be determined by calculating pressure, temperature and volume before gas is transferred into or out of the reaction chamber module.

10. The gas electrolysis apparatus according to claim 8, wherein the reaction gas product collection manifold module comprises:
the measurement container configured to temporarily store reactant gas and periodically permit extraction of the reactant gas from said measurement container; and
the subsystem comprising the acoustic sensor or the other type of electronic interface configured to facilitate estimation of quantities of the reactant gas.

11. The gaseous electrolysis apparatus according to claim 1, wherein said electronic control circuit (ECC) module comprises:
an automated special-purpose computer and display monitor, and control software;
automated gas handling system electronics, wherein said automated gas handling system electronics is coupled to, and related to associated electric valves, temperature sensors and pressure sensors;
automated anode-to-cathode voltage/current supply;
automated heater supply;
automated microwave starter or initiator electronics; and
automated heat exchanger module electronics.

12. The gaseous electrolysis apparatus according to claim 1, wherein said gas handling system comprises at least one gas manifold module, coupled to said reaction chamber module, and is configured to control gas flow, external to the reaction chamber module, while serving to minimize gas volume external to said reaction chamber module,
wherein said at least one gas manifold module comprises at least one or more of:
a hydrogen/deuterium gas supply manifold module, mechanically coupled to said reaction chamber module, and coupled to a hydrogen/deuterium supply gas supply source;
an inert carrier gas manifold module, mechanically coupled to said reaction chamber module, and coupled to an inert gas supply source;
a reaction gas product collection manifold module, mechanically coupled to said reaction chamber module, and coupled to a reaction gas product collector; or
a gas measurement and evacuation manifold module, mechanically coupled to said reaction chamber module, and coupled to a gas measurement and evacuation device.

13. The gaseous electrolysis apparatus according to claim 12, wherein said at least one gas manifold module, coupled to said reaction chamber module, comprises at least one or more of:
a cooling chamber or water jacket to provide cooling for gas tubing and pipes connected or coupled to the reaction chamber module;
at least one normally closed gas compatible valve, at least one pressure sensor and at least one temperature sensor connected to, or coupled to said electronic control circuit module/subsystem; or
at least one tank or at least one container whose known volume enables small quantities of gas to be determined by calculating pressure, temperature and volume before gas is transferred into or out of the reaction chamber module.

14. The gaseous electrolysis apparatus according to claim 1, further comprising:
wherein said modular, removable anode module comprises
wherein said modular, removable anode module comprises wherein edges at the ends of said modular, removable anode module facing the removable cathode module are tapered or curved to help prevent high voltage breakdown between said modular, removable anode module and the removable cathode module; and wherein said electric heater module disposed within said modular, removable anode module comprises:
wherein said electric heater module is configured to raise the temperature of the reaction material in the removable cathode module, by at least one of thermal radiation or diffusion; and
wherein said electric heater module is electrically connected through a feedthrough in the header module to a power supply configured to provide power to said electric heater module.

15. The gaseous electrolysis apparatus according to claim 1, wherein the removable cathode module comprises at least one or more of:
a modular, removable, hollow-shaped, cylindrical removable cathode module, electrically coupled, connected, or grounded to the reaction chamber module with a central cavity configured to receive an anode module;
wherein the removable cathode module is encased by an outer metal supporting sleeve;
wherein the removable cathode module is bounded at a base and at a top of the removable cathode module with at least one insulator endcap; or
wherein edges at each ends of a reaction material part of the removable cathode module facing the anode module are at least one of tapered or curved away from the anode module to help prevent high voltage breakdown.

16. The gaseous electrolysis apparatus according to claim 1, wherein said heat exchanger module is modular and comprises:
a flash boiler configured to provide a mist of water or other coolant to the outer surface of the reaction chamber module; and
a plurality of spray nozzles to cool at least one portion of the reaction chamber module and to facilitate and control thermal diffusion through the removable cathode module; and one or more of
the at least one steam pressure port; or
the at least one thruster port configured to provide pressure output.

17. The gas electrolysis apparatus according to claim 1, wherein said reaction gas product collection manifold module further comprises at least one or more of:
a measurement container, coupled to said reaction gas product collection manifold module, configured to temporarily store reactant gas and periodically permit extraction of the reactant gas from said measurement container; or
a subsystem, coupled to said reaction gas product collection manifold module, comprising said acoustic interface, wherein said acoustic interface comprises an acoustic sensor configured to facilitate estimation of quantities of the reactant gas.

18. The gas electrolysis apparatus according to claim 1, wherein said reaction gas product collection manifold module further comprises:
a measurement container configured to temporarily store reactant gas and periodically permit extraction of the reactant gas from said container; and
a subsystem comprising at least one of:
an acoustic sensor, or other type of electronic interface, said subsystem configured to facilitate estimation of quantities of the reactant gas.

19. The gaseous electrolysis apparatus according to claim 1, wherein said electronic control circuit (ECC) module comprises at least one or more of:
an automated special-purpose computer and display monitor, and control software;
automated gas handling system electronics, wherein said automated gas handling system electronics is coupled to, and related to associated electric valves, temperature sensors and pressure sensors;
automated anode-to-cathode voltage/current supply;
automated anode module heater supply;
automated microwave starter or initiator electronics; or
automated heat exchanger module electronics.

20. A modular gaseous electrolysis apparatus, wherein an electrolyte comprises gas, the gaseous electrolysis apparatus comprising:
an actively-cooled header module comprising at least one electrical connector or coupling, and
wherein said actively-cooled header module is configured to be at least one or more of:
opened,
removed,
closed, or
installed;
a heat exchanger module configured to:
remove heat from a surface of a reaction chamber module; and
facilitate and control a thermal gradient through a removable cathode module, and
a wall of the reaction chamber module,
wherein said heat exchanger module is separate from the removable cathode module, and
wherein the reaction chamber module is configured to receive the gas electrolyte;
wherein said heat exchanger module is configured to be at least one or more of assembled, or disassembled, and
wherein the gaseous electrolysis apparatus comprises at least one or more of:
wherein the gaseous electrolysis apparatus is configured to include hermetic seals to maintain integrity in an elevated pressure and temperature environment;
a flash boiler configured to provide a mist of water or other coolant to the outer surface of the reaction chamber module; or
a plurality of spray nozzles configured to at least one or more of:
cool at least one portion of the reaction chamber module;
facilitate thermal diffusion; or
control thermal diffusion through the removable cathode module; and
at least one or more of:
at least one steam pressure port; or
at least one thruster port configured to provide pressure output;
a gas handling system, configured to provide the gas electrolyte, said gas handling system mechanically coupled to the reaction chamber module and separate from the reaction chamber module,
wherein said gas handling system comprises at least one or more of:
a measurement container configured to temporarily store reactant gas;
a measurement container configured to permit extraction of the reactant gas; or a subsystem comprising an acoustic sensor or other type of electronic interface, configured to facilitate estimation of quantities of reactant gas;

an electronic control circuit module electrically coupled or connected to said actively-cooled header module and said gas handling system and configured to electronically control said gas handling system;

a modular, removable anode module comprising:
an electric heater disposed within the modular, removable anode module;

wherein said actively-cooled header module, said heat exchanger module, the removable cathode module, said modular, removable anode module, said electric heater, said gas handling system, and said electronic control circuit module are removably and mechanically coupled to the reaction chamber module; and wherein said gas handling system comprises:
a gas manifold module that controls gas flow external to the reaction chamber module,
wherein said gas manifold module comprises:
a reaction gas product collection manifold module, mechanically coupled to the reaction chamber module, and coupled to a reaction gas product collector and further comprising:

at least one mechanical valve;

at least one electronically controlled valve;

at least one separator valve with an electronic interface for matter output (EIMO);

at least one pressure sensor;

at least one exemplary reaction gas collection tank or bottle comprising a thermal sensor; and at least one electronic interface for matter output (EIMO) comprising at least one or more of:

the at least one acoustic sensor or the other type of electronic interface;

at least one gas detector, or at least one reaction product sensor; and wherein the at least one electronic interface for matter output (EIMO) comprises being configured to at least one or more of:

manage material output through said at least one separator valve; or facilitate estimation of quantities of reaction gas being collected.

* * * * *